US008359311B2

(12) United States Patent
Wang et al.

(10) Patent No.: US 8,359,311 B2
(45) Date of Patent: Jan. 22, 2013

(54) FEDERATED IMPLICIT SEARCH

(75) Inventors: Kuansan Wang, Bellevue, WA (US);
Emre M. Kiciman, Seattle, WA (US);
Bo-June Hsu, Woodinville, WA (US);
Chun-Kai Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 12/791,000

(22) Filed: Jun. 1, 2010

(65) Prior Publication Data
US 2011/0295852 A1 Dec. 1, 2011

(51) Int. Cl.
*G06F 17/30* (2006.01)
(52) U.S. Cl. ....................................... 707/728
(58) Field of Classification Search .............. 707/707, 707/709, 722, 723, 726, 728, 730, 732, 736, 707/737, 748, 758, 767
See application file for complete search history.

(56) References Cited

U.S. PATENT DOCUMENTS

| 7,197,457 | B2 | 3/2007 | Weng et al. |
| 7,389,299 | B2 | 6/2008 | Boguraev et al. |
| 7,630,993 | B2 * | 12/2009 | Adler et al. ........................ 1/1 |
| 7,657,504 | B2 | 2/2010 | Jing et al. |
| 7,930,302 | B2 * | 4/2011 | Bandaru et al. .............. 707/737 |
| 7,958,104 | B2 * | 6/2011 | O'Donnell ................... 707/706 |
| 8,001,119 | B2 * | 8/2011 | Aggarwal et al. ............. 707/732 |
| 2004/0193401 | A1 | 9/2004 | Ringger et al. |
| 2005/0149496 | A1 * | 7/2005 | Mukherjee et al. ............. 707/3 |
| 2006/0026152 | A1 | 2/2006 | Zeng et al. |
| 2007/0174872 | A1 | 7/2007 | Jing et al. |
| 2007/0198951 | A1 | 8/2007 | Frank |
| 2008/0114751 | A1 | 5/2008 | Cramer et al. |
| 2008/0275694 | A1 * | 11/2008 | Varone ............................ 704/9 |
| 2009/0276414 | A1 * | 11/2009 | Gao et al. ......................... 707/5 |
| 2010/0049761 | A1 * | 2/2010 | Mehta .......................... 707/709 |
| 2010/0082618 | A1 * | 4/2010 | Ott et al. ...................... 707/730 |
| 2011/0136542 | A1 * | 6/2011 | Sathish ......................... 455/566 |
| 2011/0238608 | A1 * | 9/2011 | Sathish .......................... 706/47 |

OTHER PUBLICATIONS

Chen, et al., "A*-Admissible Key-Phrase Spotting with Sub-Syllable Level Utterance Verification," retrieved at <<http://citeseerx.ist.psu.edu/viewdoc/download?doi=10.1.1.51.4829&rep=rep1&type=pdf>>, International Conference on Spoken Language Processing, 1998, 4 pages.

(Continued)

*Primary Examiner* — Cam-Linh Nguyen
(74) *Attorney, Agent, or Firm* — The Law Office of Michael E. Kondoudis

(57) ABSTRACT

A resource selection system is described for assisting a user in performing a task that includes multiple actions. At each stage of the task, the system presents a set resources from which the user may select to perform a subsequent action in the task. The system implicitly selects the set of resources based on context information that identifies the user's current informational needs. For example, the context information may be derived from textual information that is being presented on a user device, which the user is presumed to be viewing at the current time. In one implementation, the system selects the set of resources by computing language models for respective domains and respective entities. The system uses the language models to determine the relevance of the context information to each of the domains. The system then selects resources associated with domains that have been assessed as relevant.

17 Claims, 14 Drawing Sheets

OTHER PUBLICATIONS

Gruenstein, et al., "Context-Sensitive Statistical Language Modeling," retrieved at <<http://citeseerx.ist.psu.edu/viewdoc/download?doi=10.1.1.154.5267&rep=rep1&type=pdf >>, Proceedings of Interspeech, 2005, pp. 17-20.

Graupmann, et al., "Towards Federated Search Based on Web Services," retrieved at <<http://citeseerx.ist.psu.edu/viewdoc/download?doi=10.1.1.14.9926&rep=rep1&type=pdf >>, Datenbanksysteme für Business, Technologie und Web (BTW) 2003, 10 pages.

Chen, et al., "An Empirical Study of Smoothing Techniques for Language Modeling," retrieved at <<http://acm.org>>, Proceedings of the 34th Annual Meeting on Association for Computational Linguistics, 1996, pp. 310-318.

Moens, Marie-Francine, Information Extraction: Algorithms and Prospects in a Retrieval Context, Springer Netherlands, Dec. 28, 2009, Amazon.com product page only, retrieved at <<Amazon.com>>, retrieved on May 28, 2010, 6 pages.

Sarawagi, Sunita, Information Extraction, Now Publishers Inc., Nov. 30, 2008, Amazon.com product page only, retrieved at <<Amazon.com>>, retrieved on May 28, 2010, 5 pages.

Feldman, et al., The Text Mining Handbook: Advanced Approaches in Analyzing Unstructured Data, Cambridge University Press, Dec. 2006, Amazon.com product page only, retrieved at <<Amazon.com>>, retrieved on May 28, 2010, 6 pages.

Appelt, Douglas E., "Introduction to Information Extraction," retrieved at <<http://www.ai.sri.com/~appelt/ie-tutorial/IJCAI99.pdf>>, a tutorial prepared for IJCAI-99, 1999, 41 pages.

Okurowski, Mary Ellen, "Information Extraction Overview," retrieved at <<http://acm.org>>, Annual Meeting of the ACL, 1993, pp. 117-121.

Mansouri, et al., "Named Entity Recognition Approaches," retrieved at <<http://paper.ijcsns.org/07_book/200802/20080246.pdf>>, IJCSNS International Journal of Computer Science and Network Security, vol. 8, No. 2, Feb. 2008, pp. 339-443.

Shen et al., "Context-Sensitive Information Retrieval Using Implicit Feedback", SIGIR '05, Proceedings of the 28th annual international ACM SIGIR conference on Research and development in information retrieval, pp. 43-50 (2005).

* cited by examiner

FEDERATED IMPLICIT SEARCH

BACKGROUND

A conventional search engine allows a user to perform a multi-part task by entering a series of search queries. For example, a user who is planning a vacation may first create a search query to identify hotels within a destination city. The user may then input another search query to explore transportation options within that city. The user may then manually create and input yet another search query to determine the current weather of that city, and so on. The search engine responds to each of these search queries in independent fashion, e.g., based solely on the key terms within each query. Further, the search engine uses the search queries to retrieve relevant information from a single indexed corpus of data using a single search paradigm.

The above traditional approach provides acceptable results in many scenarios, but is not fully satisfactory. For example, the user may have difficulty formulating a search query which expresses a topic of interest. This problem is compounded in those circumstances in which the terms in the search query have multiple interpretations. Overall, traditional approach may be experienced by a user as potentially imprecise and cumbersome.

A user may confront similar challenges in the course of performing a multi-part task using a collection of application modules (colloquially referred to as "apps"). For example, for each part of the task, the user may manually review a collection of available application modules to determine a relevant application module. The user may then use the selected application module to perform a part of the task. The user may then repeat this manual operation for the next part of the task. Again, this procedure may be experienced by a user as tedious and prone to error. For example, the user may have difficulty in manually identifying an application module that is relevant to a current stage of the task. The user may then have difficulty in interacting with the application module that is selected.

These above shortcomings are illustrative rather than exhaustive. Traditional techniques may have yet other drawbacks.

SUMMARY

A resource selection system ("system") is described for assisting a user in performing a search-related task that includes multiple actions. At each stage of the task, the system presents a set resources from which the user may select to perform an action. The system selects the set of resources based on context information that implicitly identifies the user's current informational needs. For example, the context information may be derived in part from textual information that is being presented on a user device, which the user is presumed to be viewing at the current time.

According to another illustrative aspect, the system identifies the set of resources by generating instances of individual-domain score information associated with respective domains. The domains, in turn, are associated with different respective entities. The system can identify the set of resources by ranking instances of the individual-domain score information. In this manner, the system can perform a federated search in an implicit manner, e.g., without asking the user to manually identify relevant entities.

According to another illustrative aspect, the system generates each instance of individual-domain score information based on a language model. In one implementation, the system generates the language model using an n-gram technique.

According to another illustrative aspect, the system generates each instance of individual-domain score information by computing $P(s|D)/P(s|\sim D)$. In this expression, $P(S|D)$ refers to the probability of textual context information s occurring within an individual domain D, and $P(s|\sim D)$ refers to the probability of s occurring within domains other than D. The individual-domain score information is normalized in such a manner that the score information from one domain can be meaningfully compared with the score information from another domain.

According to another illustrative aspect, the system can generate the individual-domain score information using different modes. In a first mode, the system can receive data from a corresponding entity, from which it generates the language model and the individual-domain score information. In a second mode, the system can receive individual-score information that is generated by the entity. In a third mode, the system can receive a language model from the entity, which allows it to generate the individual-domain score information. In each case, the generation of the language model can be performed off-line, e.g., before a particular instance of textual context information s is encountered.

According to another illustrative aspect, the set of resources may correspond to application modules that can be executed by the user device to perform respective functions. At least a subset of the resources may correspond to application modules that are currently installed on the user device.

According to another illustrative aspect, the system can also select at least one text portion based on the textual information that is presented by the user device. The text portion provides content for use in conjunction with at least one of the set of resources. For example, the system can extract one or more keywords from textual information that is currently being presented by the user device for use by a particular application module. The application module can perform a search based on the keywords, and/or perform some other action.

According to another illustrative aspect, a presentation module is described for providing resources to the user as the user carries out a task. The presentation module operates by providing a current presentation to a user via a user device. For example, the current presentation may provide a document that contains textual information. The presentation module also provides a set of resources that are selected based on current context information associated with the current presentation. For example, the presentation module can display the resources as selectable icons. The presentation module then receives a selection by a user of a resource from among the set of resources and invokes an associated action. The action, once invoked, prompts the presentation module to provide a new current presentation, along with an updated set of resources. The above-summarized operations can be repeated any number of times until the user completes the task.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative system for assisting a user in performing a multi-part task. Section B describes illustrative methods which explain the operation of the system of Section A. Section C describes illustrative processing functionality that can be used to implement any aspect of the features described in Sections A and B.

Figure 19:
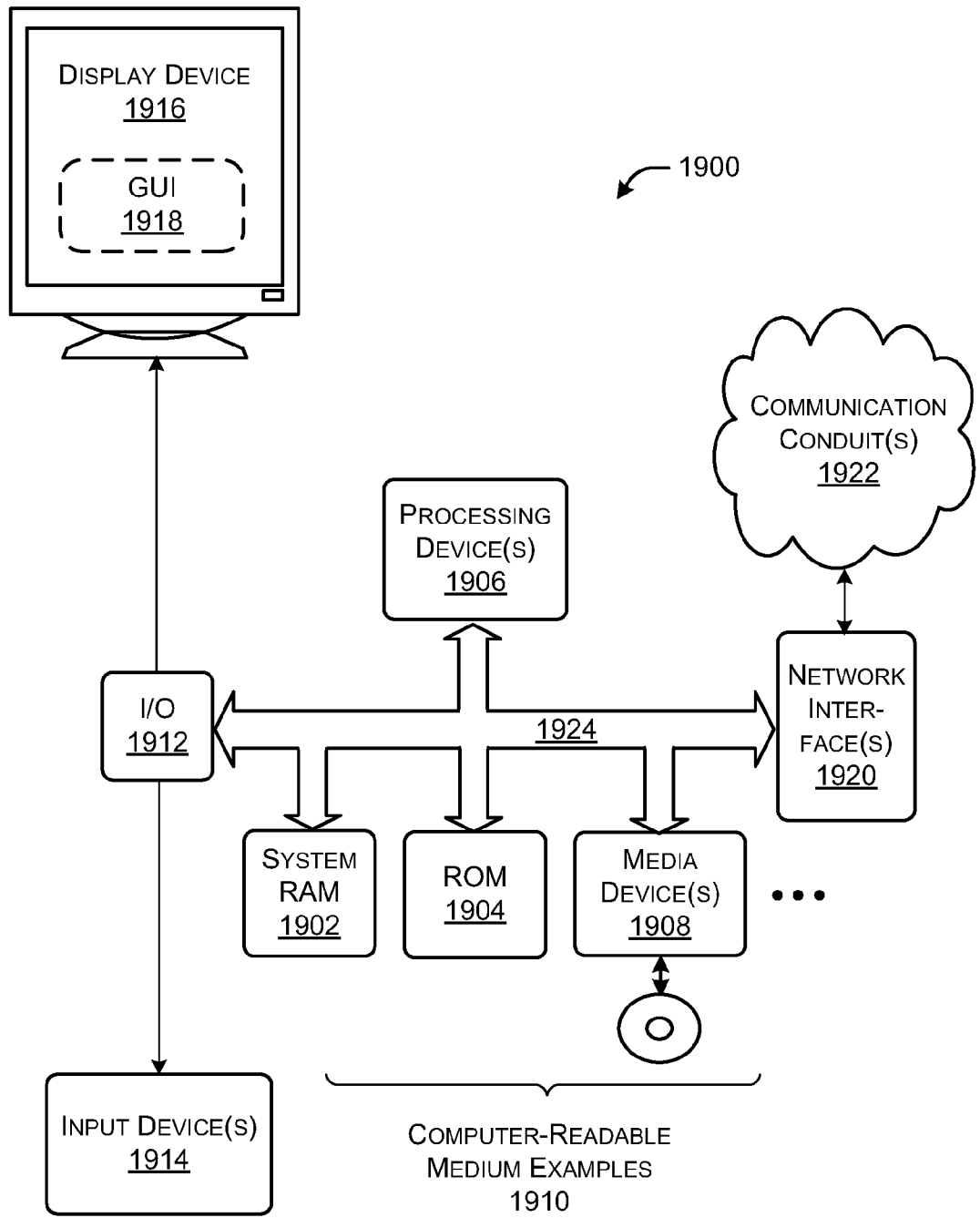
FIG. 19 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 19, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative System

Figure 1:
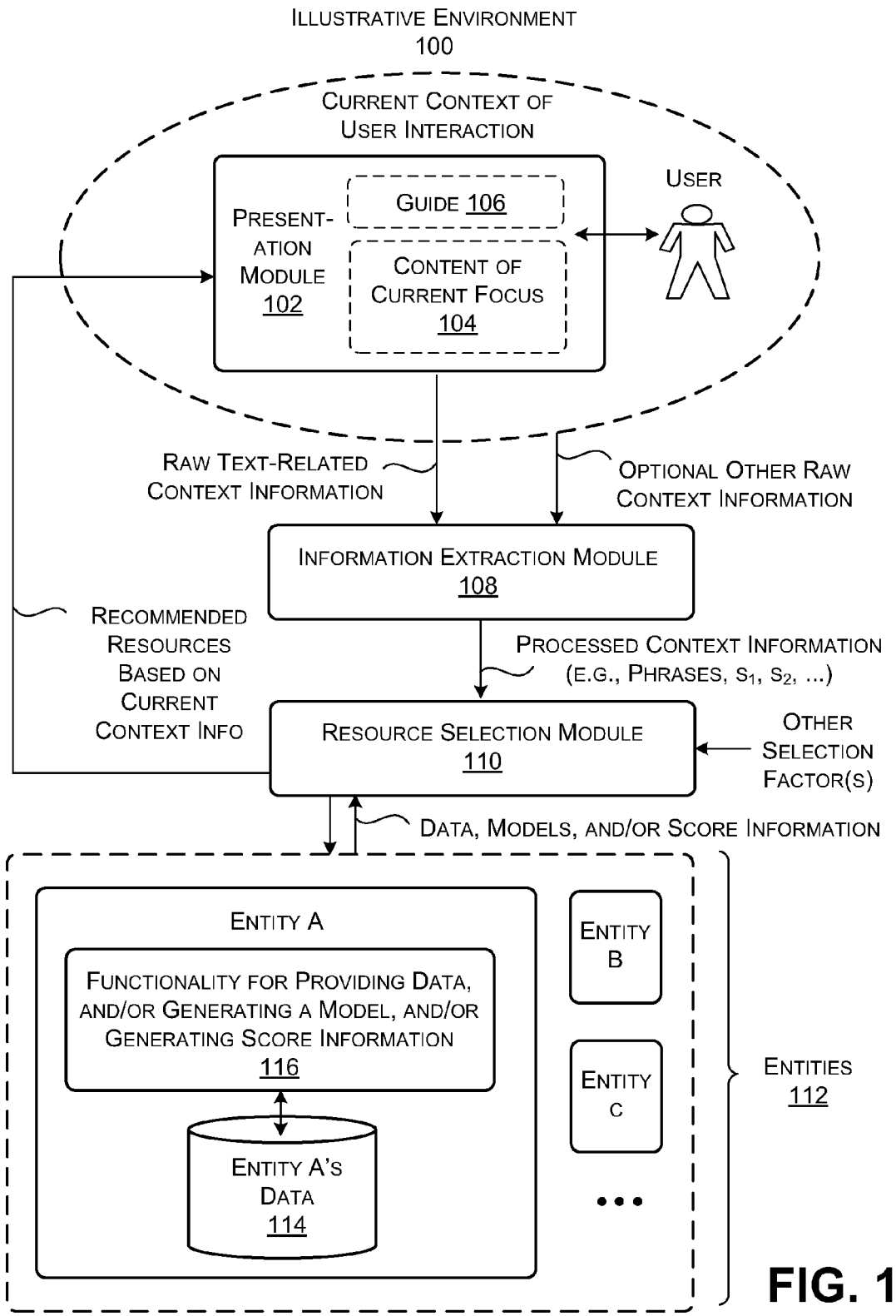
FIG. 1 shows an illustrative environment for assisting a user in completing a multi-part task.
Figure 2:
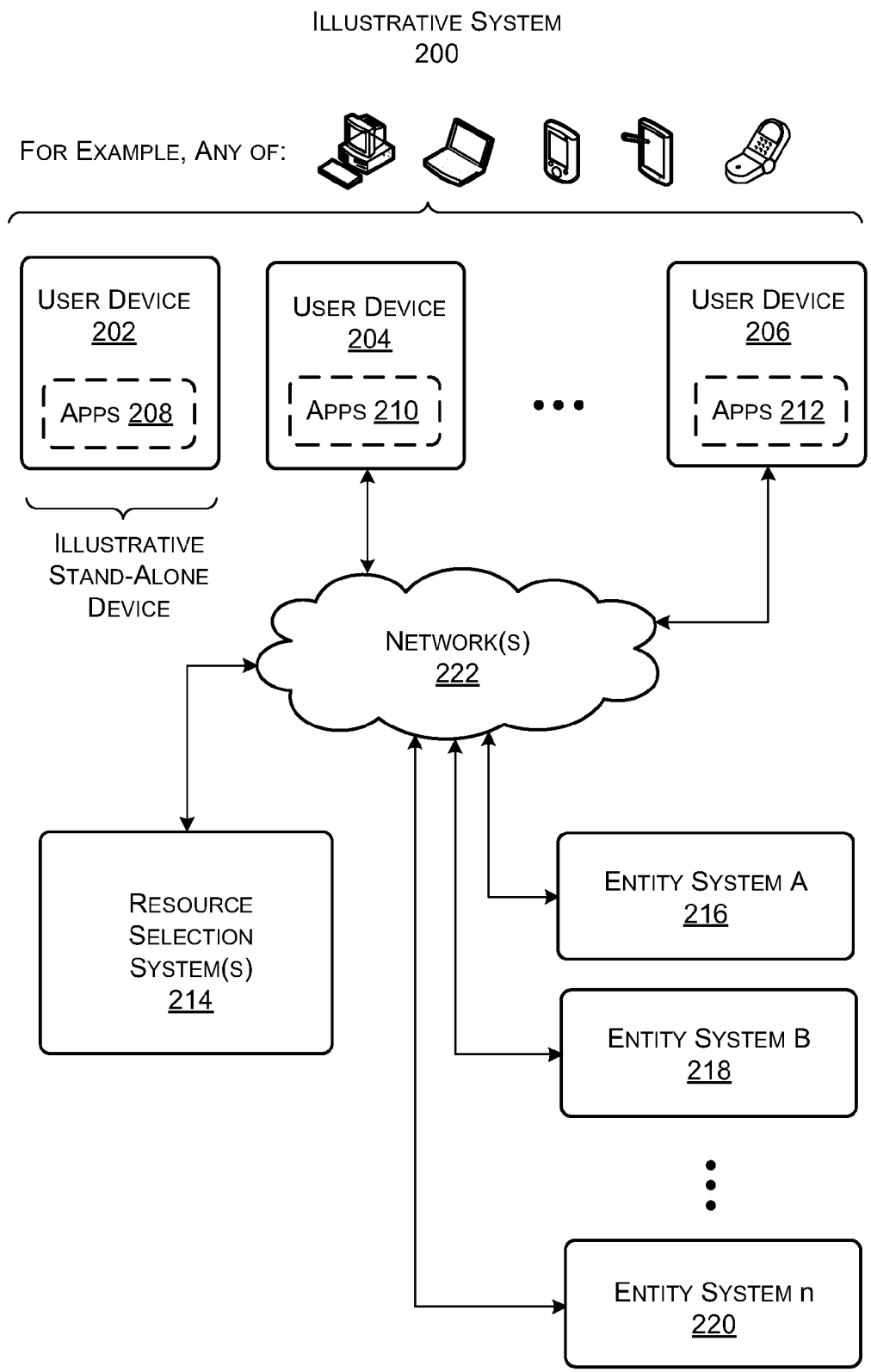
FIG. 2 shows one illustrative system for implementing the environment of FIG. 1.

FIG. 1 shows an illustrative environment 100 for guiding a user in performing a task in a series of steps, e.g., in one implementation, including two or more steps. The environment 100 can include (or can be conceptualized to include) a plurality of modules for performing respective functions. The modules can be mapped to different physical implementations in different ways. FIG. 2 shows one such implementation. To begin with, however, the functionality of the environment 100 will be explained in a general manner that encompasses plural implementations.

The environment 100 will be explained in a top-down manner, starting with the depicted presentation module 102. The presentation module 102 provides information to the user in the course of performing a task. For example, in the scenario developed later, the presentation module 102 may begin by presenting an Email message, following by a list of restaurants, followed by a street map. More generally stated, at any given time, the presentation module 102 provides content 104 that is associated with the user's presumed current focus of interest—namely, what the user is presumed to be viewing at that given time. The content 104 may include, at least in part, textual information.

The presentation module 102 also provides guide information 106. The guide information 106 provides a plurality of resources that can be selected by the user. These resources provide information or functionality which allows the user to perform a subsequent action in the task. For example, in one case, the resources may correspond to a plurality of application modules for performing respective operations. The presentation module 102 may represent these application modules as respective selectable icons or the like. In another case, a set of resources may correspond to search results presented in a search result page, having no functionality associated therewith.

From a high-level perspective, the environment 100 operates by examining the content 104 to extract context information therefrom. The context information implicitly expresses the user's presumed informational needs in performing the task at a particular point in time. The environment 100 uses the context information to identify a set of resource that will satisfy the user's current informational needs. The environment 100 then presents those resources to the user via the guide information 106. The environment 100 can also automatically extract at least one text portion based on the context information. An associated resource can use the text portion to perform a function.

To perform the above operations, an information extraction module 108 first extracts the context information from the content 104 that the user is presumed to be viewing. More specifically, the information extraction module 108 can identify two types of context information. A first type of context information pertains to textual information which is extracted from the content 104. In one concrete example, the first type of context information may correspond to phrases extracted by a textual document, such as an Email message. A second type of context information may include supplemental information which may have a bearing on the user's information needs, obtained from a source other than the content 104 that is presented to the user. For example, the second type of context information may include the current location of the user (which can be determined based on the GPS coordinates of a user device that is being used to deliver the content 104). According to another example, the second type of context information may identify the current orientation of the user at a particular location (which can be determined using a camera mechanism and/or an accelerometer, etc.). The orientation of the user, in turn, can provide information regarding the direction that the user is facing, and thus presumably what the user is looking at. According to another example, the second type of context information may include the current time and/or date information. According to another example, the second type of context information may include a history of previous actions taken by the user, and so on. No limitations are placed on the supplementation information that may have a bearing on the user's current informational needs.

The information extraction module 108 can assemble various components of context information into a unified record. FIG. 1 refers to such an integrated record as processed context information. In one case, the processed context information may include at least salient word and phrases extracted from the content 104.

A resource selection module 110 uses the processed context information (referred to below as just "context information") to determine a set of pertinent resources. In one case, the resource selection module 110 can perform this task by determining the relevancy of the context information in each of a plurality of domains. As the term is used herein, a domain refers to a framework for providing a particular type of service to a user. For example, a first domain may provide information regarding restaurants and dining. A second domain may provide information pertaining to travel. A third domain may provide map-related information, and so on. Domains may overlap. For example, a domain related to local businesses may overlap with the domain related to restaurants and dining.

Each domain is associated with one or more resources which perform respective functions. For example, a resource associated with the restaurant-related domain may provide functionality for recommending restaurants. A resource associated with travel may provide functionality for making travel reservations. A resource associated with maps may provide functionality for displaying maps, and so on.

The resource selection module 110 can rank the assessed relevancies of different domains and select a set of n domains (and corresponding resources) that are deemed most relevant. As shown in FIG. 1, the resource selection module 110 can also take into consideration other factors in ranking domains and associated resources. For example, the resource selection module 110 can receive feedback from users regarding resources that the users have selected in different scenarios (e.g., by monitoring and recording click-through-rates or the like). The resource selection module 110 can modify the relevancy-based ranking of domains based on the feedback received from users, e.g., by favorably biasing resources which have proven popular among users.

Section B will explain one illustrative algorithm for assessing the relevancies of different domains with respect to current context information. By way of overview, the environment 100 determines a language model for each domain. A language model defines the linguistic characteristics of each domain. For example, as will be described in greater detail below, the environment 100 can generate an n-gram model for each domain. The environment 100 can then determine the relevance of textual information extracted from the content 104 with respect to each of the plurality of language models. According to the terminology used herein, the environment 100 generates individual-domain score information that expresses the relevance of each domain. Plural instances of the individual-domain score information are referred to as plural-domain score information.

FIG. 1 also shows a plurality of entities 112. Each entity is associated with a respective domain. For example, each entity may correspond to a network-accessible service that provides certain information and other services to users. In some cases, an entity may host a service (and associated domain) that corresponds to a particular topic or collection of such topics. Alternatively, or in addition, an entity may host a service (and associated domain) that provides a certain type of functionality; this type of service may be, in some instances, relatively agnostic with respect to subject matter.

Each entity may provide (or otherwise make available) data associated with its domain. For example, assume that entity A corresponds to an agent which provides a hotel recommendation and reservation service. Accordingly, entity A may provide a data store 114 that contains textual records that provide respective user reviews of hotels. Assume that entity B provides a tax preparation service. That entity may provide a data store that contains a collection of tax forms and instructions provided by a revenue agency. Assume that entity C provides a map service. That entity may provide a data store that provides names of streets, addresses, etc. Assume that entity D (not shown) provides a general encyclopedia service. That entity may provide a data store that provides a large number of documents on a wide range of topics. FIG. 1 shows that entity A physically houses or otherwise maintains its associated data store 114. Alternatively, or in addition, an entity may provide a data store through reference to an existing data store provided by another entity or a standard data store provided by the resource selection module 110 itself, etc.

In the examples described above, an entity's data store may include documents or other items that pertain to a field (or fields) associated with an entity. Alternatively, or in addition, an entity may expressly create data which characterizes its services, such as by creating textual information which describes the features of application modules that it hosts. In any case, for each domain, the environment 100 computes the language model based on the data associated with the domain.

To this point, the explanation has described the manner in which the environment 100 generates score information in terms of the environment 100 as a whole, rather than individual components within the environment 100. This is because the environment 100 can accommodate multiple modes for generating score information. That is, for different modes, different agents within the environment 100 may play a role in determining the score information. In a first mode, the resource selection module 110 can receive data from an entity. It then uses that data to generate a language model and individual-domain score information. In a second mode, an entity can generate a language model and individual-domain score information and send the individual-domain score information to the resource selection module 110. In a third mode, an entity can generate a language model, which it sends to the resource selection module 110. The resource selection module 110 can then generate the individual-domain score information based on the language model. In these modes, the environment 100 can compute (and periodically update) the language models in an offline fashion.

The different modes confer different levels of data confidentiality to the entities. In the first mode, the entity maintains the least amount of data confidentiality (since it forwards all of its data to the resource selection module 110). The second mode provides the greatest amount of data confidentiality (since the entity reveals only the final individual-domain score information to the resource selection module 110). The third mode provides a level of data confidentiality between the first mode and the second mode. The different modes confer different levels of data confidentiality because they have different respective bearings on the ability of the resource selection module 110 to view and act on the entity's data. But in all cases, the resource selection module 110 may provide additional and separate guarantees pertaining to the confidentiality of the shared data. For example, the resource selection module 110 may promise an entity that its data will not be shared with third-parties. The resource selection module 110 may also allow an entity to delete or otherwise remove its shared data if it no longer wishes to participate in the services offered by the resource selection module 110.

FIG. 1 also indicates that entity A includes functionality 116 which: a) sends data when requested (as per the first mode); b) sends individual-domain score information (as per the second mode); and/or c) sends language model information (as per the third mode). Still other techniques and corresponding modes can be used to generate plural-domain score information.

Considered as a whole, the environment 100 of FIG. 1 allows the user to perform a federated (or meta) search for relevant resources by determining the user's informational needs in an implicit manner. The input to such a search is considered implicit because the user is not asked to expressly articulate his or her informational needs; rather, the context information is inferred from whatever the user happens to be viewing at the moment. As mentioned, the environment can supplement this textual information with other clues as to the user's informational needs (such as the user's current geographical position, etc.). The search is federated in the sense that it involves collecting information from plural entities associated with respective domains. As will be described below, the environment 100 can also select at least one text portion based on the current context information. The environment 100 can apply that text portion as an input to a corresponding resource (providing that the user selects that resource).

FIG. 2 shows a system 200 which represents one illustrative implementation of the environment 100 of FIG. 1. In this setting, the system 200 includes plural user devices (e.g., 202, 204, 206) that can be operated by a user. Each user device can correspond to any type of unit that performs a computing operation. Illustrative user devices include personal computing devices, workstation devices, laptop devices, personal digital assistant devices, mobile telephones, game consoles, set-top boxes, and so on. In a subset of these cases, the user device may represent a portable device that communicates with other functionality via wireless signals.

In one case, each user device can include one or more application modules currently installed on the user device. An application module, as said, can provide any type of service to the user pertaining to any topic or combination of topics. As depicted in FIG. 2, the user device 202 can include application modules 208, the user device 204 can include application modules 210, and the user device 206 can include application modules 212. In one implementation, each application module can be implemented as a software module that can be downloaded from a source (e.g., an entity). Any user device can also make reference to an application module stored elsewhere (such as at a network-accessible location). For example, a user device can store a bookmark which identifies the location of an application module. In one case, a user device can make use of a bookmarked application module without downloading it into its local store.

The system 200 can also include a resource selection system 214 and plural entity systems (e.g., 216, 218, ... 220). The resource selection system 214 and entity systems (216, 218, ... 220) can each be implemented in any manner, such as by one or more server computers, one or more data stores, routing functionality, and so on.

The different functions described with respect to FIG. 1 can be mapped onto the components of the system 200 in different ways. For example, in one implementation, different instances of the presentation module 102 can be implemented by the user devices (202, 204, ... 206). The information extraction module 108 and the resource selection module 110 can be implemented by the resource selection system 214. The entities 112 can be implemented by the respective entity systems (216, 218, ... 220).

In one case, the various modules described above can be coupled together using one or more networks 222, referred to in the singular below (as a "network") for brevity. For example, the network 222 can comprise a wide area network (e.g., the Internet), a local area network, or combination thereof. The network 222 can include any combination of wireless links and hardwired links. Further, the network 222 can be driven by any protocol or combination of protocols.

The system 200 can also accommodate one or more user devices (such as user device 202) that operate in a standalone mode of operation. For example, this user device can implement any of the presentation module 102, the information extraction module 108, the resource selection module 110, and the entities 112 in a local manner.

The various components shown in FIG. 2 can be administered by any agent or combination of agents (where an agent refers to any actor, such as a person, organization, etc.). In one case, a first agent administers the resource selection system 214 and separate respective agents administer the various entities systems (216, 218, ... 220). The agent which administers the resource selection system 214 may establish contracts with the agents which administer the entity systems (216, 218, ... 220) which enable the resource selection system 214 to make use of data provided by the entity systems (216, 218, ... 220), either directly or indirectly.

FIGS. 3-9 show a series of user interface presentations that can be provided by the presentation module 102 of FIG. 1. Generally, assume that the overall task that the user intends to perform is to select a restaurant at which to meet a friend, and to determine the location of the selected restaurant. The user (Joe) performs these tasks in response to reading a message from his friend (Sandra). The presentation module 102 provides a series of instances of content 104 and associated instances of guide information 106 to assist the user (Joe) in performing this multi-part task.

In general, the presentation module 102 can use different approaches to present the content 104 and guide information 106. FIGS. 3-9 show one such approach. Other approaches can adopt other functional components, other graphical organizations of functionality, other styles and formats of presentation, and so on.

Figure 3:
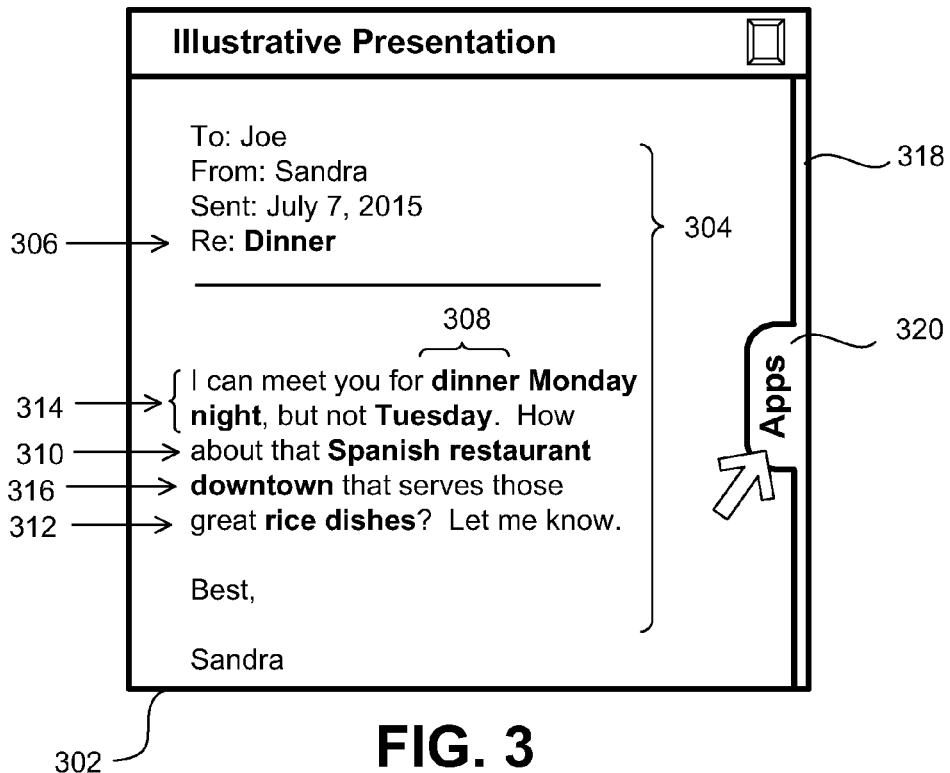
FIGS. 3-9 show a series of user interface presentations that can be provided by the environment of FIG. 1.

Starting with FIG. 3, assume that that the user first invokes an Email application. In response, the presentation module 102 presents a user interface presentation 302 that shows an Email message 304 sent by the friend, Sandra, to the user, Joe. In the terminology developed above, the Email message 304 corresponds to the content 104 that reflects the current focus of the user's presumed interest. In this example, the content 104 constitutes textual information which indicates potential topics of user interest. For example, the Email message 304 includes a number of words and phrases that pertain to a dining theme (e.g., "dinner" 306, "dinner" 308, "Spanish restaurant" 310, and "rice dishes" 312. The Email message 304 also includes at least one word or phrase that pertains to a scheduling topic (e.g., "Monday night but not Tuesday" 314). The Email message 304 also includes at least one word or phrase that pertains to a mapping topic (e.g., "downtown" 316), and so on. Other context information can supplement the textual information. For example, a user who is operating his user device within Seattle, Wash. may be presumed to be interested in seeking dining arrangements in that city.

The presentation module 102 also provides an application bar 318, having an associated selectable tab 320 (labeled "Apps"). The application bar 318 identifies a set of resources that are relevant to the topics in the Email message 304, as assessed by the resource selection module 110. In the context of the terminology developed above, the application bar 318 constitutes guide information 106 that presents a set of resources. Initially, however, the presentation module 102 may display the application bar 318 in a collapsed state which does not reveal the identity of the set of resources. The presentation module 102 can present the application bar 318 in collapsed form (until selected) so as not to clutter screen space, which may be beneficial for small user devices having corresponding small display screens. In other approaches, the presentation module 102 can provide a non-concealed application bar 318 and/or an application bar 318 that is selectable via other mechanisms besides, or in addition to, the selectable tab 320.

Figure 4:
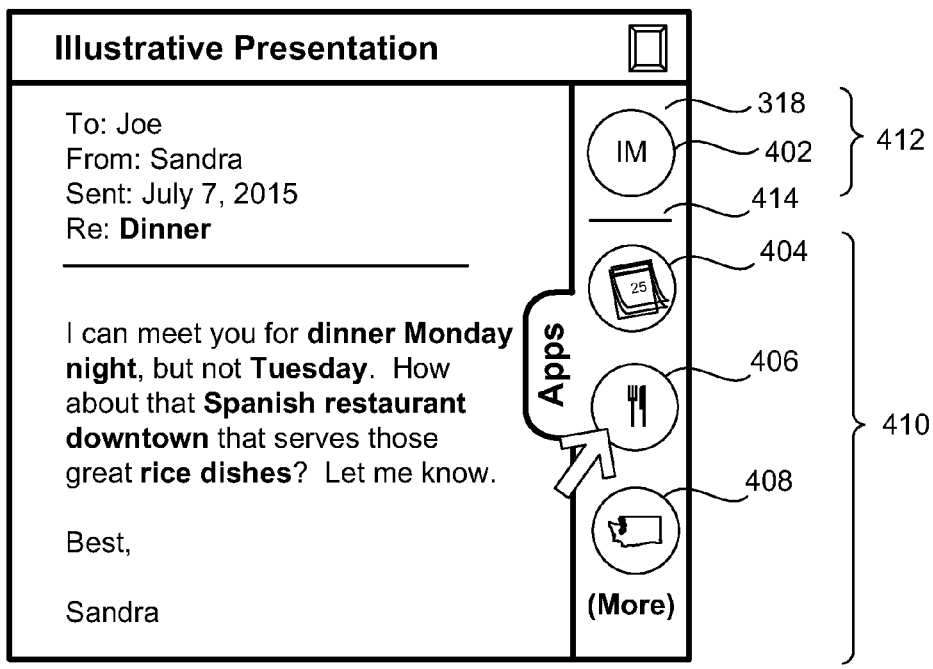

Assume that the user, Joe, selects the selectable tab 320, e.g., by touching the selectable tab 320 (if the user device includes touch-screen input functionality), and/or by clicking on the selectable tab 320 using a mouse device, etc. In response, the presentation module 102 expands the application bar 318 by showing a set of resources. As shown in FIG. 4, the presentation module 102 can present the set of resources as a set of selectable icons. An icon represents any information that visually represents an associated resource, e.g., by displaying textual and/or symbolic information associated with that resource.

A resource generally refers to any service that provides any type of assistance to the user in the course of performing the overall task. Some resources include services which provide information. In addition, some resources allow a user to perform various operations; for example, one such resource provides supplemental functionality which allows a user to a make reservation, etc.

In the merely illustrative case of FIG. 4, a first selectable icon 402 identifies an instant messaging (IM) resource. A user can send and receive IM messages via this resource. A second selectable icon 404 identifies a calendar resource. The user can view calendar information and make appointments via this resource. A third selectable icon 406 identifies a restaurant recommendation resource. The user can search for relevant restaurant reviews via this resource. And a fourth selectable icon 408 represents a map-related resource. The user can search for map-related information using this resource. The presentation module 102 can display any number of such selectable icons in any manner.

More specifically, in one implementation, the presentation module 102 can display two types of selectable icons (and associated resources). A first set of selectable icons 410 corresponds to resources that are selected based on their assessed relevancy to the topics of interest that have been identified in the Email message 304. A second set of selectable icons 412 corresponds to resources that are selected, at least in part, independent of the context information. For example, the second set of selectable icons 412 may correspond to resources that the user has designated as favorites. For example, assume that the user frequently uses an IM resource. The user may therefore designate this IM resource as a favorite, upon which the presentation module 102 can present the selectable icon 402 in the application bar 318 regardless of the information imparted by the current content 104. The presentation module 102 can discriminate the relevancy-based selectable icons from the supplemental selectable icons in any manner; in the merely representative case of FIG. 4, the presentation module 102 can provide a dividing bar 414 which indicates the division between the two types of selectable icons.

In the example of FIG. 4, the resource selection module 110 presents the second selectable icon 404 (corresponding to a calendar application) because the Email message 304 includes at least some phraseology pertaining to time and date information. The resource selection module 110 presents the third selectable icon 406 because the Email message 304 includes at least some phraseology pertaining to dining. The resource selection module 110 selects the fourth selectable icon 408 because the Email message 304 includes at least some phraseology pertaining to location.

In one case, the resources correspond to application modules which are currently installed on the user device. In another case, the resources are not necessarily installed on the user's device. For example, one or more resources may correspond to application modules which are bookmarked (or otherwise referenced) by the user device, yet stored elsewhere. In another case, the resources correspond to non-installed application modules which are not even bookmarked by the user device, but nevertheless available. In one scenario, the user's device can make use of these non-installed resources without installing a local copy of these resources (e.g., as is the case with web application modules). Alternatively, or in addition, the user's device can take action to install an identified resource if it is selected by the user. Any business model can be applied to make use of application modules provided by third parties. In some cases, a party may allow a user to access its application modules without payment of a fee; in other cases, a party may ask the user to pay a fee or the like to gain access to its application modules, where such payment can be structured in any manner.

In one case, the resource selection module 110 can apply a weight which favorably biases the relevancy of any application module that is currently installed or bookmarked by the user device. If an application module is neither installed nor bookmarked, but is otherwise deemed highly relevant, the presentation module 102 may display its corresponding icon in the application bar 318. If such an application module is selected by the user, the user device can, in one possible scenario, download the application module. The presentation module 102 can display selectable icons for non-installed/non-bookmarked resources in a different manner compared to installed/bookmarked resources to communicate this distinction to the user.

Figure 5:
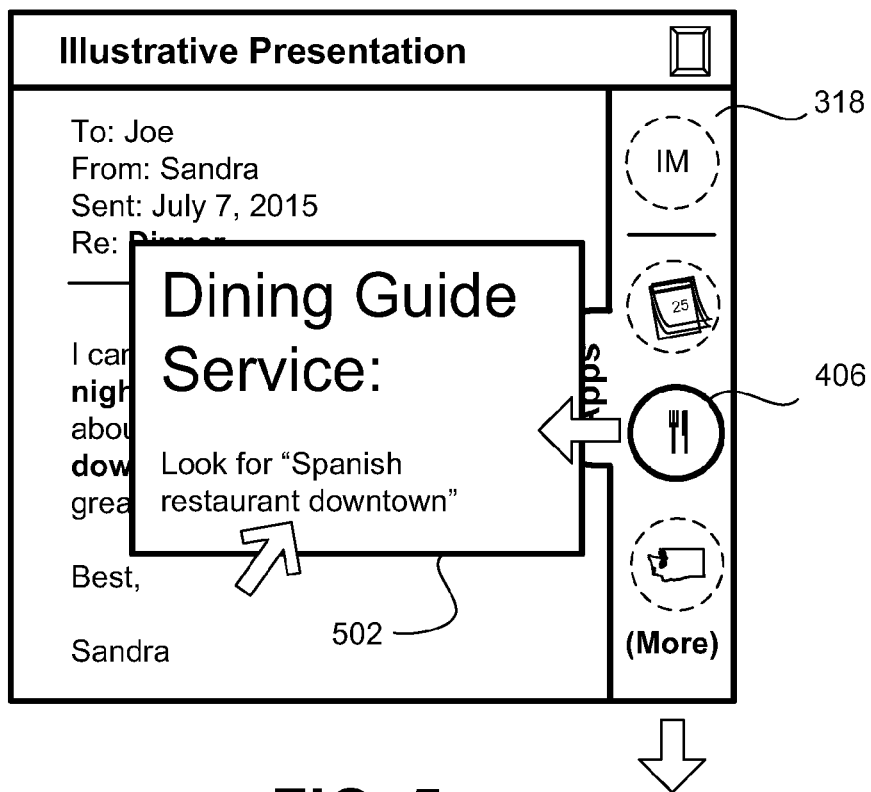

Assume now that the user selects the third selectable icon 406 pertaining to dining. In response, as shown in FIG. 5, the presentation module 102 can gray out the non-selected icons (or de-emphasize these icons in any other manner). Further, the presentation module 102 can optionally present preview information 502 to the user; this preview information 502 identifies an action that will be invoked using a corresponding resource (in this case, an application module that provides a restaurant recommendation service). In this case, the preview information 502 identifies that a search will be performed within the service using the keywords of "Spanish" and "downtown." The presentation module 102 has selected these keywords from the Email message 304 based on any information extraction mechanism. In this case, the presentation module 102 has determined that the keywords "Spanish" and "downtown" are salient terms in pinpointing the topic of the user's focus of interest (as opposed to more general terms that may appear in the Email message 304).

In general, the preview information 502 is useful to convey the relationship between the Email message 304 and the recommendations provided by the resource selection module 102. Here, the presentation module 102 conveys the preview information 502 as a pop-up message that is graphically associated with the selectable icon 406. The presentation module 102 can alternatively, or in addition, use other approaches to highlight such correspondence. For example, the presentation module 102 can highlight salient words and phrases in the original Email message 304. In an alternative implementation, the presentation module 102 can invoke an action using a selected resource without giving the user the preview information 502.

Figure 6:
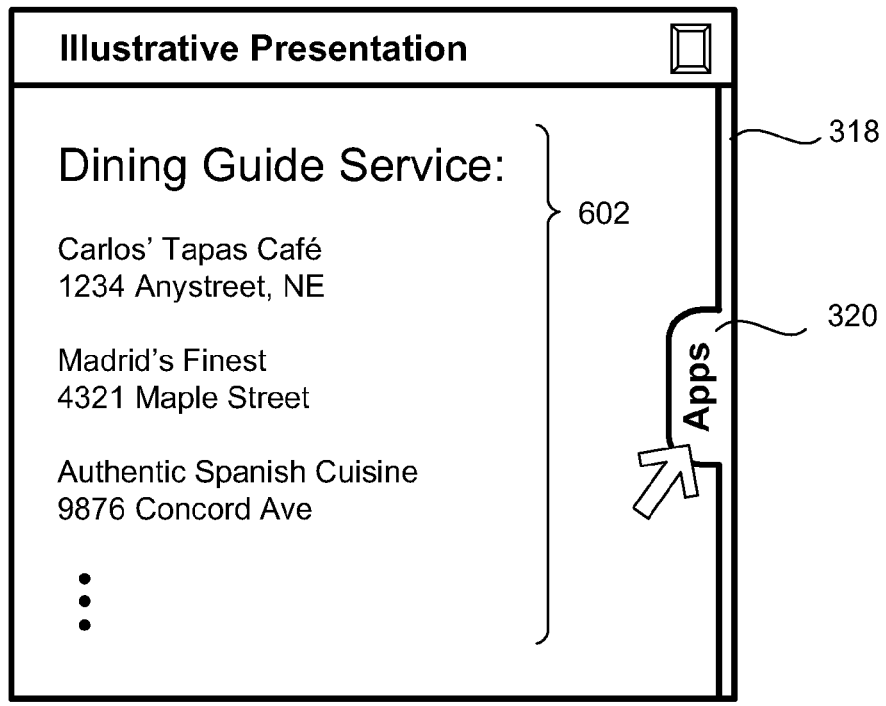

Assume that the user authorizes the presentation module 102 to invoke the services of the restaurant recommendation service. In response, the corresponding entity performs a search within its data (based on the keywords identified in the preview information 502) and provides search results. As shown in FIG. 6, the presentation module 102 displays a list 602 of restaurants which represent those search results. In the terminology of FIG. 1, the list 602 constitutes new content 104 that is presented by the presentation module 102. The presentation module 102 also presents an updated list of resources that pertain to the new content. However, in the initial state shown in FIG. 6, the application bar 318 is in its collapsed state that does not show the list of resources.

Figure 7:
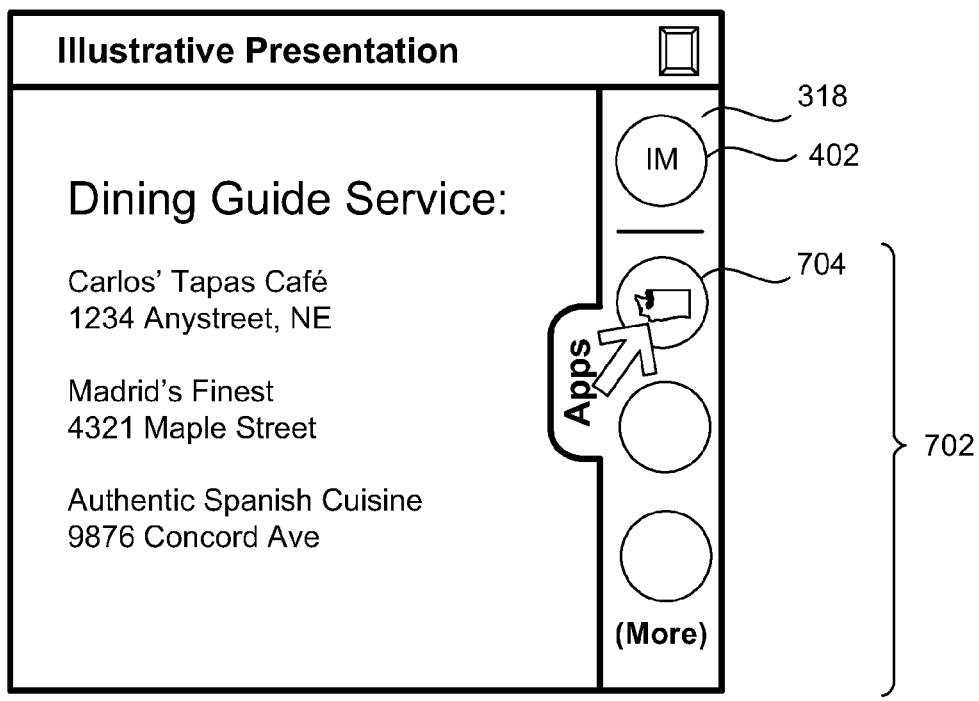

Assume that the user next activates the selectable tab 320 of the application bar 318. This prompts the presentation module 102 to display a new list of selectable icons, as shown in FIG. 7. As said, the presentation module 102 selects the new resources based on their assessed relevancy to the new content (e.g., at least in part, based on the list 602 of restaurants). This means that the selectable icons 702 shown in FIG. 7 may differ from the selectable icons shown in FIG. 4. However, in this scenario, the presentation module 102 can also present at least one selectable icon 704 that is also presented in FIG. 4 (because this selectable icon 704 pertains to a resource that is relevant to both the first presented content and the second presented content). The selectable icon 704 pertains to a map-related resource. The resource selection module 110 deems that this resource is relevant because the list 602 of restaurants includes address information, which pertains to the topic of maps. The presentation module 102 can again present one or more selectable icons (e.g., selectable icon 402) which are based on other factors besides (or in addition to) assessed relevance. For example, selectable icon 402 represents a context-independent resource. If such "other" selectable icons are not relevant to the current focus of the user's interest, then the presentation module 102 can display such selectable icons in a grayed out mode, or in some other graphical mode which indicates their potential lack of relevance.

Figure 8:
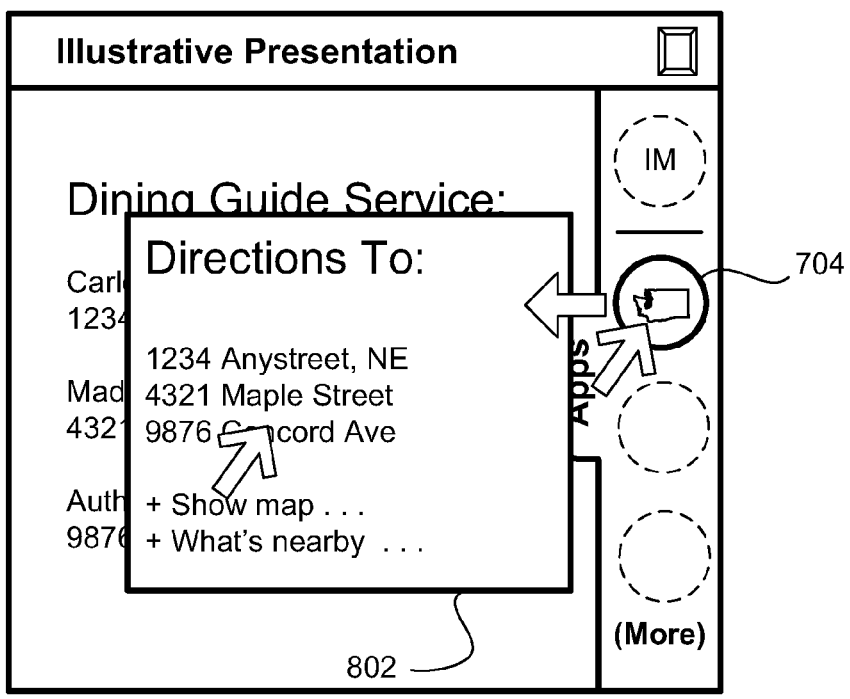

Assume that the user now selects the selectable icon 704 corresponding to the map-related application. In response, as shown in FIG. 8, the presentation module 102 can again gray out the non-selected icons. Further, the presentation module 102 can again display preview information 802. This preview information 802 asks the user to identify which of three addresses are to be searched using the map-related application module. The presentation module 102 has extracted the three addresses from the list 602 of restaurants shown in FIG. 6.

Figure 9:
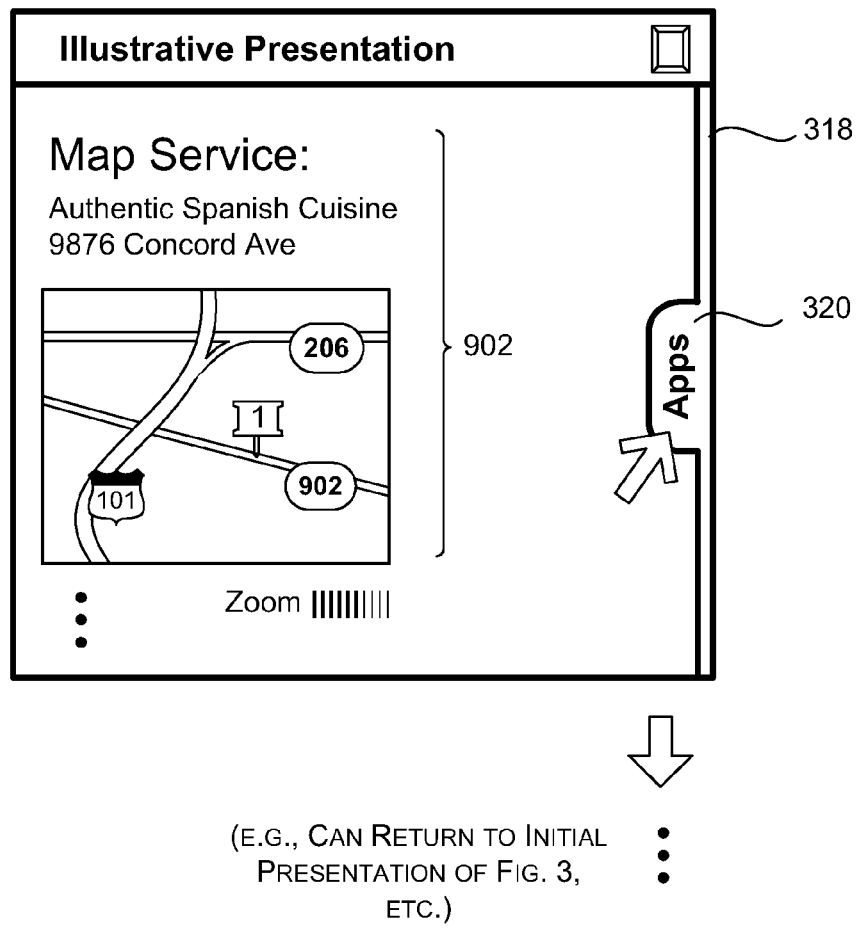

Assume that the user selects the third address in the list. In response, the presentation module 102 can invoke the map-related resource, asking this service to retrieve map information for the identified address. FIG. 9 shows the resultant map information 902. The map information 902 constitutes new content. The application bar 318 can present a list of resources which pertain to this new content, any of which can be selected to continue the process described above.

Figure 10:
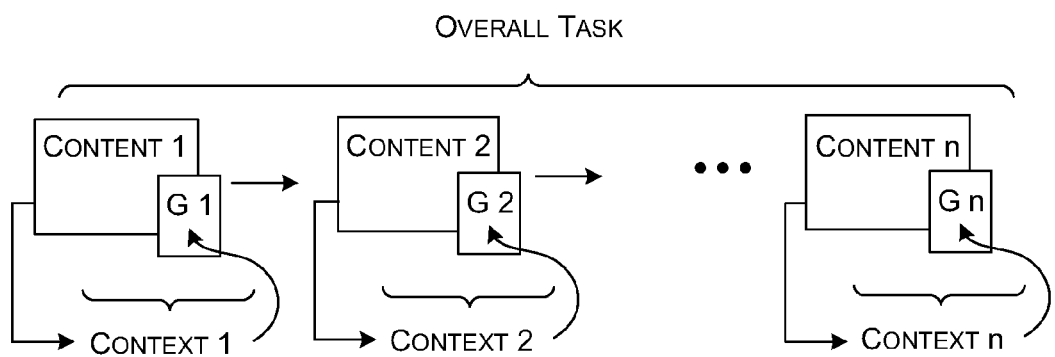
FIG. 10 shows a graphical overview of one manner in which the environment of FIG. 1 can be used to complete a task in a series of steps.

FIG. 10 summarizes the above-described example in high-level graphical form. The user uses the presentation module 102 to perform an overall task that comprises plural operations that will involve the use of plural respective resources. At any given time in the sequence, the presentation module 102 presents content. The content determines, at least in part, the current context of the user's presumed focus of interest (along with, optionally, other contextual factors). Further, at any given time, the presentation module 102 presents guide information which provides a list of resources. The user's selection of a resource acts as a trigger which invokes subsequent content and guide information. This process continues until the user completes the overall task.

By virtue of the above described manner of operation, the environment 100 facilitates the user's identification and selection of relevant resources in the course of performing the multi-part task. In addition, the environment 100 can automatically extract at least one text portion from the context information (such as the keywords shown in the preview information). If a user selects a resource, the environment 100 feeds a corresponding text portion as an input to the selected resource. In this manner, the environment 100 facilitates the user's interaction with each individual resource, that is, by automatically applying information obtained from current context information to a next-selected application module. Overall, the environment 100 provides a cohesive user experience, guiding the user from one part of the task to another in a structured manner. The user may be left with the impression that the environment "understands" the nature of the overall task, and is actively guiding the user in completing the task.

As described above, various supplemental factors may govern the set of resources that are displayed at any given time, in addition to the content-based relevancy considerations described above. For example, the presentation module 102 can provide one or more selectable icons that correspond to resources that have already been invoked by the user at a prior stage (or stages) of the task. For example, the presentation module 102 can include a selectable icon that allows a user to return to the Email resource (which provides the presentation 302 of FIG. 3). The presentation module 102 may opt to display this selectable icon because there is a reasonable probability that the user may wish to return to the Email resource to complete a task, e.g., by sending an Email message to inform his friend regarding the selection of a restaurant.

Alternatively, or in addition, the resource selection module 110 may select a previously-selected resource because that previous resource has been assessed as being relevant to the current context information. For example, the user may enter the names of dinner guests while interacting with a restaurant reservation service. The resource selection module 110 can determine that this name-related context information has a bearing on the Email resource (because an Email resource is a forum in which names appear with high frequency). In response, the presentation module 102 can display an icon associated with the Email resource, allowing the user to return to the Email resource.

B. Illustrative Methods

FIGS. 11-18 explain the operation of the environment 100 of FIG. 1 in flowchart form. Since the principles underlying the operation of the environment 100 have already been described in Section A, some of the operations will be addressed in summary fashion in this section.

Figure 11:
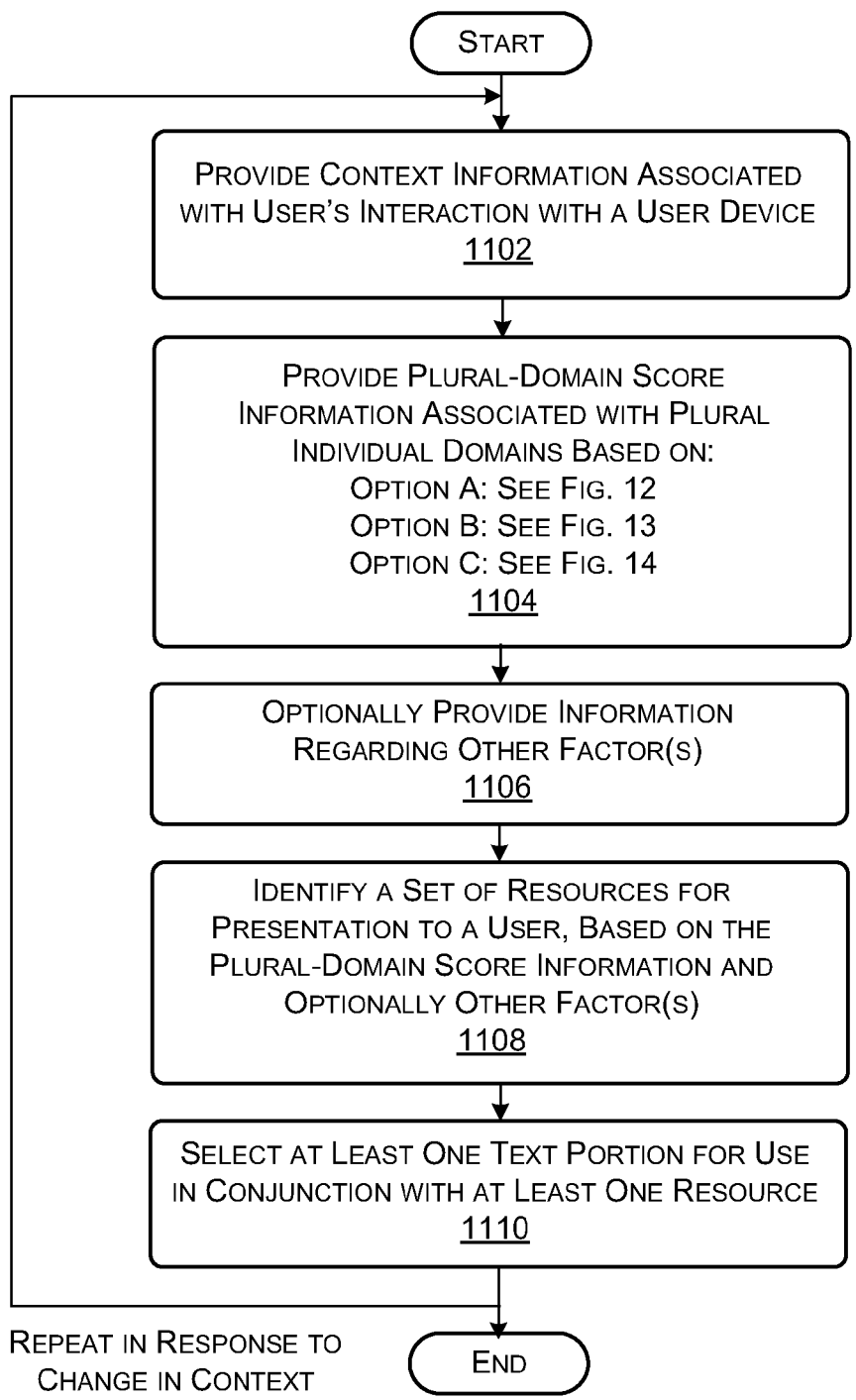
FIG. 11 is a flowchart which describes one manner of operation of a resource selection module provided by the environment of FIG. 1.

To begin with, FIG. 11 shows a procedure 1100 which describes one manner of operation of the resource selection module 110 provided by the environment 100 of FIG. 1. As described in Section A, the resource selection module 110 identifies a set of resources associated with respective domains based on context information.

Figure 15:
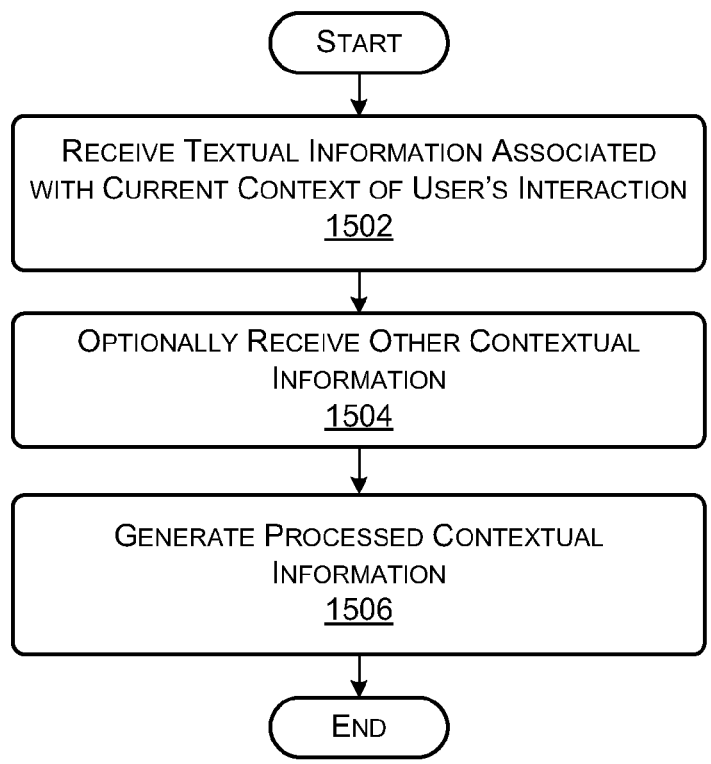
FIG. 15 is a flowchart which describes one manner of operation of an information extraction module of the environment of FIG. 1.

In block 1102, the resource selection module 110 receives context information from the information extraction module 108. The context information pertains to the user's current focus of interest in interacting with a user device. The context information may include, in part, textual information conveyed by current content 104 being displayed by the user device. FIG. 15 provides additional details regarding one manner in which the information extraction module 108 can form the context information.

Figure 12:
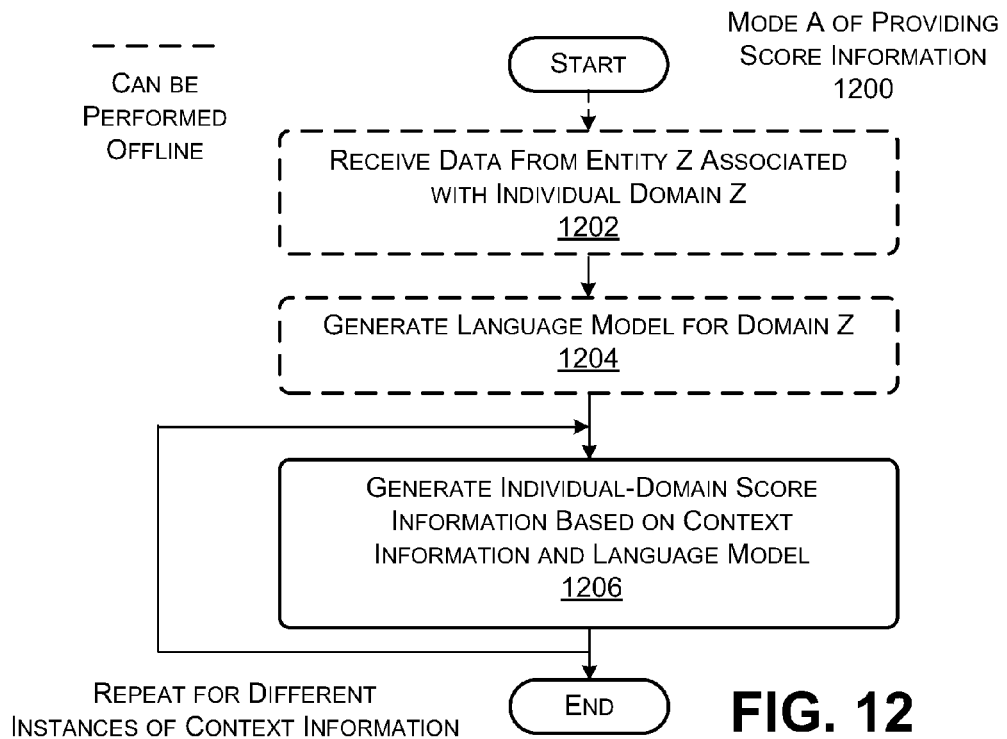
FIGS. 12-14 are flowcharts that show three different respective techniques for generating individual-domain score information in the context of the procedure of FIG. 11.
Figure 13:
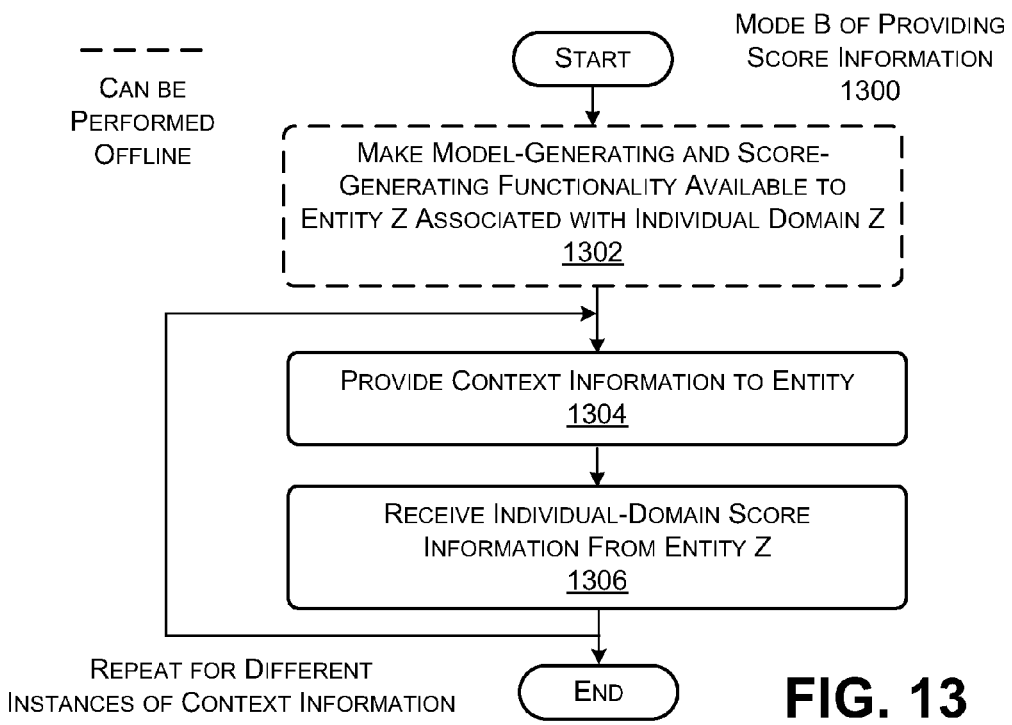
Figure 14:
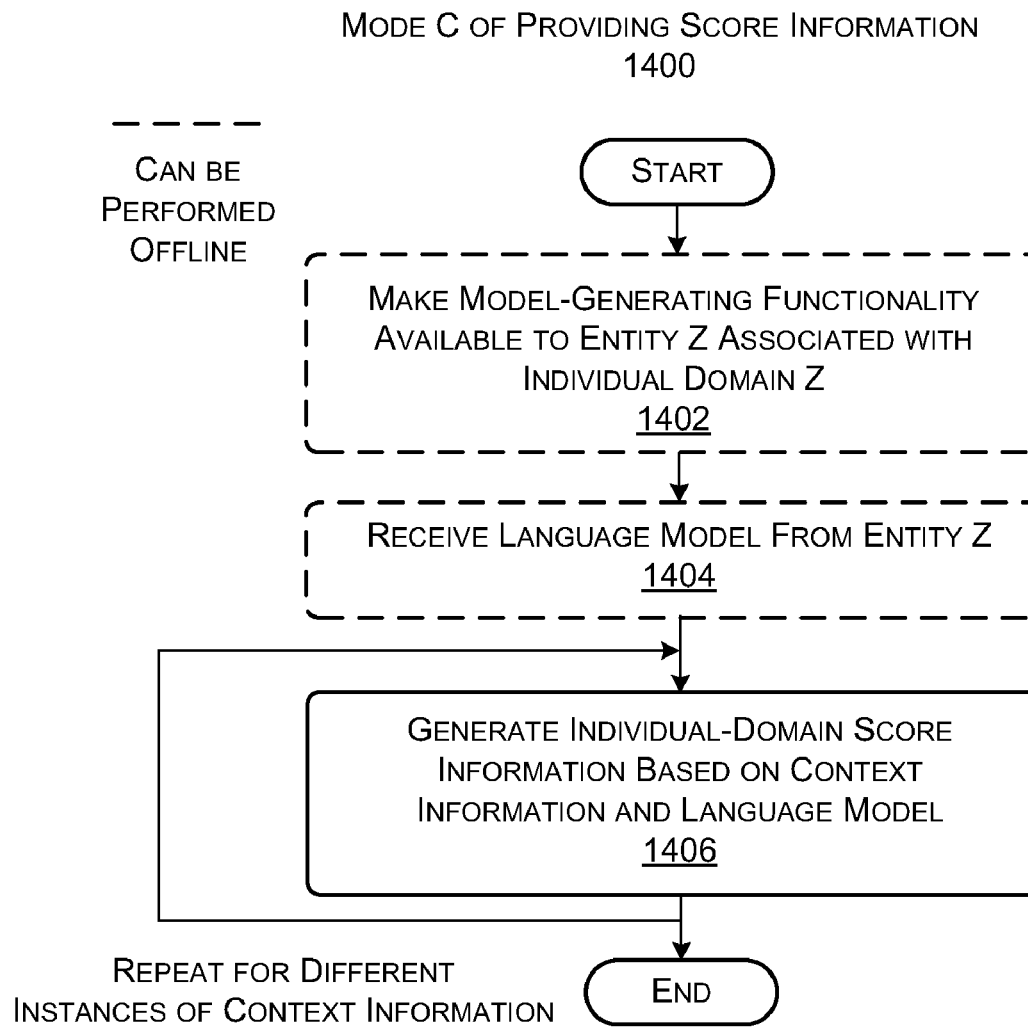
Figure 16:
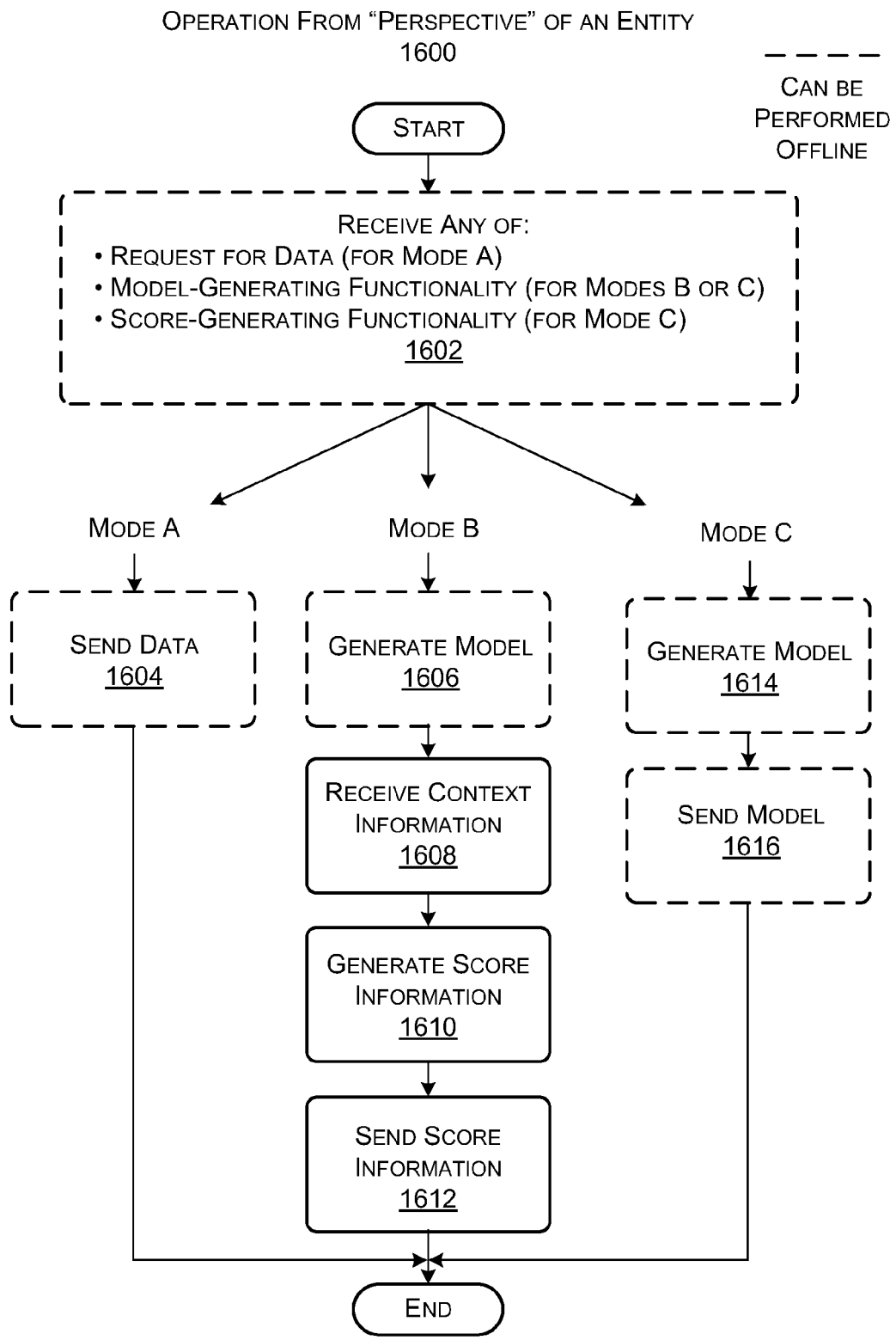
FIG. 16 is a flowchart which describes one manner of operation of an entity within the environment of FIG. 1, where the entity is associated with a respective domain.

In block 1104, the resource selection module 110 provides plural-domain score information that describes the relevancy of the context information with respect to each of a plurality of domains. The plural-domain score information influences the ranking of domains and resources associated with the domains. As set forth in Section A, the term individual-domain score information pertains to the relevancy of the context information to a particular domain. A domain, in turn, pertains to the operating framework by which an entity delivers information and functionality to users. By way of preview, FIGS. 12-14 present additional information regarding three different modes in which the resource selection module 110 can determine the plural-domain score information. FIG. 16 complements FIGS. 12-14 by describing one manner in which any entity can assist the resource selection module 110 in determining individual-domain score information for a corresponding individual domain.

In block 1106, the resource selection module 1106 can optionally receive other factors which influence the ranking of domains. According to one factor, the resource selection module 110 can receive preference information which indicates the user's preferences as to resources. For example, the resource selection module 110 can mine history information to determine the resources that the user has selected on previous occasions. According to another factor, the resource selection module 110 can determine the selection histories of a population of users to determine resources that the population has selected on previous cases, and so on.

In block 1108, the resource selection module 110 can rank the domains (and associated resources) based on the plural-domain score information and/or based on any supplemental factor(s). For example, the resource selection module 110 can rank the domains in order of relevancy and then select the n highest ranked domains (and associated resources) to present to the user as guide information 106. The resource selection module 110 can use the supplemental factor(s) as weighting considerations which influence the ranking For example, suppose that the ranking selection module 110 determines that the user (or a population of users) prefers a certain resource. The resource selection module 110 can therefore assign relatively high weight to this resource, which boosts its relevancy relative to less popular resources. As another example, the resource selection module 110 can assign a boosting weight to resources that are currently installed on the user's device, and so on. As another example, the resource selection module 110 can attempt to display a diverse selection of resources to ensure that a user is presented with a range of choices, e.g., so that the user is not presented with solely various dining applications or solely various mapping applications, etc. As another example, the resource selection module 110 can attempt to maintain the same ordering of resources in those cases in which a current calculation of individual-domain score information is similar to a preceding calculation of individual-domain score information, e.g., so as to reduce potential confusion caused by frequently changing icons. Various other supplemental factors can play a role in modifying the relevancy of resources.

Moreover, the presentation module 102 can also present favorite resources which are not necessarily related to the current focus of the user's interest. The selectable icon 402 of FIG. 4 is an example of such a resource.

In block 1110, the resource selection module 110 can select at least one text portion (or other information) based on the textual information that is presented to the user. For example, in FIG. 5, the resource selection module 110 has extracted the text portion "Spanish" and "downtown" from the Email text, for use in conjunction with a dining application module. The resource selection module 110 can feed this text portion as input into the dining application module, e.g., to construct a search query that includes this text portion.

FIG. 12 shows a procedure 1200 which represents a first mode by which the resource selection module 110 can determine individual-domain score information for a particular domain. Assume that the resource selection module 110 interacts with an entity Z to determine the individual-domain score information for a domain Z. In one implementation, the resource selection module 110 may be implemented by the resource selection system 214 of FIG. 2, and the entity Z may be implemented as one of the entity systems (216, 218, . . . 220), which are coupled together via the network 222. Generally, for FIGS. 12, 13, 14, and 16, the boxes depicted in dashed lines refer to operations that can be performed in an off-line manner, e.g., independent of the use of the language model to compute a particular instance of score information.

In block 1202, the resource selection module 110 receives data from the entity Z for domain Z. The data corresponds to information maintained by the entity which pertains to a topic (or operating framework) associated with domain Z. For example, in the case of a service which provides recommendations for restaurants, the data may correspond to a collection of textual records that provide customer reviews of restaurants.

In block 1204, the resource selection module 110 computes a language model for the data that it has received. Additional information regarding this operation will be provided below.

At this point, suffice it to say that the language model identifies the characteristics of the entity's data by identifying prevalent phrases in the data.

In block 1206, the resource selection module 110 computes the individual-domain score information using the context information and the language model. Again, additional information regarding this operation is provided below. Note that block 1206 can be repeated any number of times using the same language model, for different instances of context information. (The language model can be updated on any basis, such as a periodic basis and/or an event-driven basis.)

FIG. 13 shows a procedure 1300 which represents a second mode by which the resource selection module 110 can determine individual-domain score information for a particular domain. Again assume that the resource selection module 110 interacts with entity Z associated with domain Z.

In block 1302, the resource selection module 110 can provide model-generating functionality and score-generating functionality to entity Z. This enables entity Z to compute the language model and individual-domain score information without providing its raw data to the resource selection module 110.

In block 1304, the resource selection module 110 provides context information to the entity Z. The context information may include words and phrases that are extracted from the current content 104 that the user is reviewing or is presumed to be reviewing (such as the Email message 304 shown in FIG. 3).

In block 1306, the resource selection module 110 can receive the individual-domain score information from entity Z. Note that blocks 1304 and 1306 can be repeated any number of times using the same language model, for different instances of context information.

FIG. 14 shows a procedure 1400 which represents a third mode by which the resource selection module 110 can determine individual-domain score information for a particular domain. Again assume that the resource selection module 110 interacts with entity Z associated with domain Z. The third mode represents a hybrid of the first mode and the second mode, allowing the entity Z to maintain its raw data, but revealing more information to the resource selection module 110 compared to the second mode.

In block 1402, the resource selection module 110 makes model-generating functionality available to the entity Z. This allows entity Z to compute a language model based on its data without providing the data to the resource selection module 110.

In block 1404, the resource selection module 110 receives the language model from entity Z.

In block 1406, the resource selection module 110 uses the context information and the language model to compute the individual-domain score information. Note that block 1406 can be repeated any number of times using the same language model, for different instances of context information.

Generally stated, FIGS. 12-14 provide different ways in which different agents can assist the resource selection module 110 in determining relevant resources. These actions are performed in a distributed fashion. For example, in the second mode, two entities can compute respective instances of individual-domain score information in an independent manner.

One way of computing a language model and individual-domain score information is described below. Since these operations can be performed by different actors, the explanation identifies the agent which performs these operations as the overall environment 100 shown in FIG. 1.

In one example, the environment 100 uses an n-gram technique to generate the language model. In this technique, the language model identifies the probability of occurrence of each string s within a data corpus, denoted as P(s), where s is a string occurring within the textual information of the content 104. This probability can be generated by identifying different n-length sequences of words within s, and then determining the conditional probability of occurrence for each of these word groupings within the corpus. For example, assume that n is 2, and the string s has a sequence of m words, $w_1, w_2, W_m$. Then the P(s) can be approximated based on:

$$P(s) = \sum_{i=1}^{m} p(w_i | w_{i-1})$$
$$= P(w_1) \cdot P(w_2 | w_1) \cdot P(w_3 | w_2) \cdot P(w_4 | w_3) \cdot$$
$$P(w_5 | w_4) \ldots \cdot P(w_m | w_{m-1}).$$

The probability information for each term in the above formula can, in turn, be derived from counting the number of occurrences of the corresponding bigram sequence of words within the corpus. If n=3, then the environment 100 can modify the above equation to consider sequences of three words. If n=4, then the environment 100 can modify the above equation to consider sequences of four words, and so on.

More specifically, the environment 100 uses the n-gram technique to first generate the probability of a phrase s within a domain D associated with an entity, denoted by P(s|D). The environment 100 also generates the probability that the phrase s will occur in domains other than D, denoted as P(s|~D). The environment 100 then computes individual-domain score information as:

Score Information=$P(s|D)/P(s|\sim D)$.

The term P(s|~D) can be computed by forming an n-gram language model in the manner described above, except that the domain corpus is based on a generic background corpus, such as all web documents. If this equation produces a high value, this means that the phrase s is prevalent in the corresponding domain D, but is not otherwise common to all domains in general. In other words, the phrase s can be considered a telltale phrase which strongly points to the particular domain D.

Further, by virtue of the use of the above equation, instances of the individual-domain score information are normalized. This means that the individual-domain score information for a first domain can be meaningfully compared with the individual-domain score information for a second domain. More specifically, the score information is normalized such that a value of 1 means that there is equal probability of finding s in P(s|D) and P(s|~D).

In some cases, the environment 100 can extract a single phrase s from the content 104. In this scenario, the environment 100 computes the score information for each domain using the equation provided above. In other cases, the environment 100 can extract plural phrases from the content 104. In this scenario, the environment 100 can compute the score information for each domain for each phrase s using the equation provided above. The environment 100 can then compute overall score information for a domain by averaging the individual instances of score information associated with respective phrases, or by performing some other type of aggregation of the instances.

The environment 100 can use a number of different techniques to improve the performance of its model-generating and score-generating functionality. For example, the environment 100 can apply any technique or combination of techniques to smooth a language model to account for instances in which a particular phrase has not yet been encountered in a domain (and therefore the count information for this phrase is actually zero). The smoothing operation modifies the count information such that zero count values do not bias the results. Background information on different smoothing techniques can be found in a number of sources, such as Chen, et al., "An Empirical Study of Smoothing Techniques for Language Modeling," *Proceedings of the 34th Annual Meeting on Association for Computational Linguistics*, 1996, pp. 310-318.

In addition, the environment 100 can optionally apply a technique to dynamically adjust a language model as changes occur within the underlying data set. One technique that can be used in this regard is described in commonly-assigned application Ser. No. 2/684,749, filed Jan. 8, 2010, and entitled "Adaptive Construction of a Statistical Language Model," naming the inventors of Wang, et al., and incorporated by reference herein in its entirety.

Further, the environment 100 can compute plural language models for a single entity. For example, the environment 100 can identify various sub-domains within a domain. The environment 100 can then compute a language model for each sub-domain. The environment 100 can then generate score information for each language model by determining the relevance of each phrase s in each sub-domain.

The sub-domains can be related to each other in various ways. In one case, an entity can host an encompassing language model for the entire domain. The entity can then provide separate language models for individual topics within the domain, associated with respective sub-domains. For example, consider the case of an entity which allows users to search for customer reviews of restaurants. That entity can provide an encompassing language model that encompasses all reviews for all restaurants. The entity can also provide other language models based on restaurants of a particular food type (e.g., Italian, Mexican, etc.), or a particular location (e.g., Seattle, Dallas, etc.), or a particular service model (e.g., sit-down, take-out, etc.), and so on.

In addition, or alternatively, any entity may identify different sub-domains for each resource that it hosts. For example, a resource may correspond to an application module which provides a collection of user interface pages. The user may engage these different user interface pages to perform different respective tasks. In this case, the entity may provide a collection of phrases which characterize each user interface page, each collection of phrases constituting a sub-domain for which a language model may be computed. This allows the environment 100 to pinpoint relevant resources in a more fine-grained manner. For example, assume that the environment 100 determines that the user is reading an Email message that includes the following text: "reservation," "restaurant," and "7:00 PM." In response, the environment 100 can select an application module associated with a dining service, and, more particularly, the environment 100 can select a particular part of that application module which allows a user to make a reservation.

As described above, having generated the score information for each domain (and, if applicable, each sub-domain), the environment 100 can use the score information to rank the domains. The environment 100 can display the top-ranking n resources associated with the top-ranking n domains. Alternatively, the environment 100 can consider any domain having score information over a prescribed threshold as relevant; the environment 100 can then prominently display the domains with the highest relevance.

FIG. 15 shows a procedure 1500 by which the information extraction module 108 of FIG. 1 can extract context information associated with the user's current focus of interest. In one case, the information extraction module 108 can perform this function after the content is received by the user device and displayed to the user. For example, the content may correspond to the Email message 304 shown in FIG. 3. Alternatively, or in addition, the information extraction module 108 can perform this function prior to displaying the content to the user. For example, the information extraction module 108 can include a proxy agent which receives the content prior to sending the content to the presentation module 102. For example, the proxy agent can be implemented as an HTTP proxy agent which receives search results from a content provider or the like.

In block 1502, the information extraction module 108 can extract salient textual information from textual information that has been (or will be) presented to the user as content 104. The information extraction module 108 can use any information extraction technique to perform this task. In one case, the information extraction module 108 can determine every possible phrase in the content 104, e.g., by segmenting the textual information in different ways. In other cases, the information extraction module 108 can extract a subset of phrases that are most likely to accurately characterize the meaning of the content 104. To this end, the information extraction module 108 can use any type of named entity recognition functionality. For example, the information extraction module 108 can identify salient phrases based on any type of lexical analysis technique, any type of pattern recognition technique, any type of classification technique, etc. Background information on the general topic of information extraction and entity recognition is provided in the following representative sources: Moens, Marie-Francine, *Information Extraction: Algorithms and Prospects in a Retrieval Context*, Springer Netherlands, Dec. 28, 2009; Sarawagi, Sunita, *Information Extraction*, Now Publishers Inc., Nov. 30, 2008; Feldman, et al., *The Text Mining Handbook: Advanced Approaches in Analyzing Unstructured Data*, Cambridge University Press, Dec. 11, 2006; Appelt, Douglas E., "Introduction to Information Extraction," *AI Communications*, Vol. 12, Issue 3, August 1999, pp. 161-172; Okurowski, Mary Ellen, "Information Extraction Overview," *Annual Meeting of the ACL*, 1993, pp. 117-121; Mansouri, et al., "Named Entity Recognition Approaches," *IJCSNS International Journal of Computer Science and Network Security*, Vol. 8, No. 2, February 2008, pp. 339-443, etc.

In block 1504, the information extraction module 108 can additionally receive other types of context information. For example, the information extraction module 108 can receive position information regarding the current location at which the user is operating the user device (which can be determined by GPS technology in one example).

In block 1506, the information extraction module 1504 can optionally expand any of the context information collected in blocks 1502 and 1504 into more refined context information, e.g., by making reference to any source of supplementation information. In this sense, the context information collected in blocks 1502 and 1504 can be considered as raw context information and the context information provided in block 1506 can be considered as processed context information.

For example, assume that the raw context information pertains to the GPS coordinates of a user, who happens to be operating her user device within a shopping mall. Block 1506 can entail consulting a map service to correlate the GPS coordinates with an indication that the user is currently within a shopping environment. Orientation information (if collected) can yield additional information regarding the user's presumed focus of interest. The processed context information can include information which reflects this "added on" or supplemental context information.

Blocks 1504 and 1506 can also involve mining other sources of supplemental information, such as weather information, user history information (which indicates prior selections made by the user), user population history information (which indicates prior selections made by a population of users), demographic information, current news information, and so on. The environment 100 can allow a user to expressly opt in or opt out with respect to the collection of any personal information. Further, the environment 100 can allow a user to select the manner in which the information is used and retained. Further, the environment 100 can apply appropriate safeguards to ensure the secrecy of personal information.

FIG. 16 shows a procedure 1600 which describes one manner of operation of an entity of the environment of FIG. 1. This figure complements the description of FIGS. 12-14 and will therefore be described in summary fashion. Assume that the entity is entity Z which pertains to domain Z.

In block 1602, the entity Z receives various data from the resource selection module 110 depending on what mode is being used to compute the individual-domain score information. In the first mode, the entity Z receives a request to provide data to the resource selection module 110. In a second mode, the entity Z receives model-generating functionality and score-generating functionality which allow it to compute the individual-domain score information. In a third mode, the entity Z receives just the model-generating functionality which allows it to compute just the language model. The model-generating functionality that the entity Z receives in modes 2 and 3 includes access to the background probability information, e.g., P (s|~D).

Block 1604 describes the behavior of the entity Z for the first mode. In this action, the entity Z sends the requested data to the resource selection module 110.

Blocks 1606-1612 describe the behavior of the entity Z for the second mode. Namely, in block 1606, the entity Z generates a language model. In block 1608, the entity Z receives context information. In block 1610, the entity Z generates individual-domain score information. In block 1612, the entity Z sends the individual-domain information to the resource selection module 110.

Blocks 1614 and 1616 describe the behavior of the entity Z for the third mode. Namely, in block 1614, the entity Z generates the language model. In block 1616, the entity Z sends the language model to the resource selection module 110.

Figure 17:
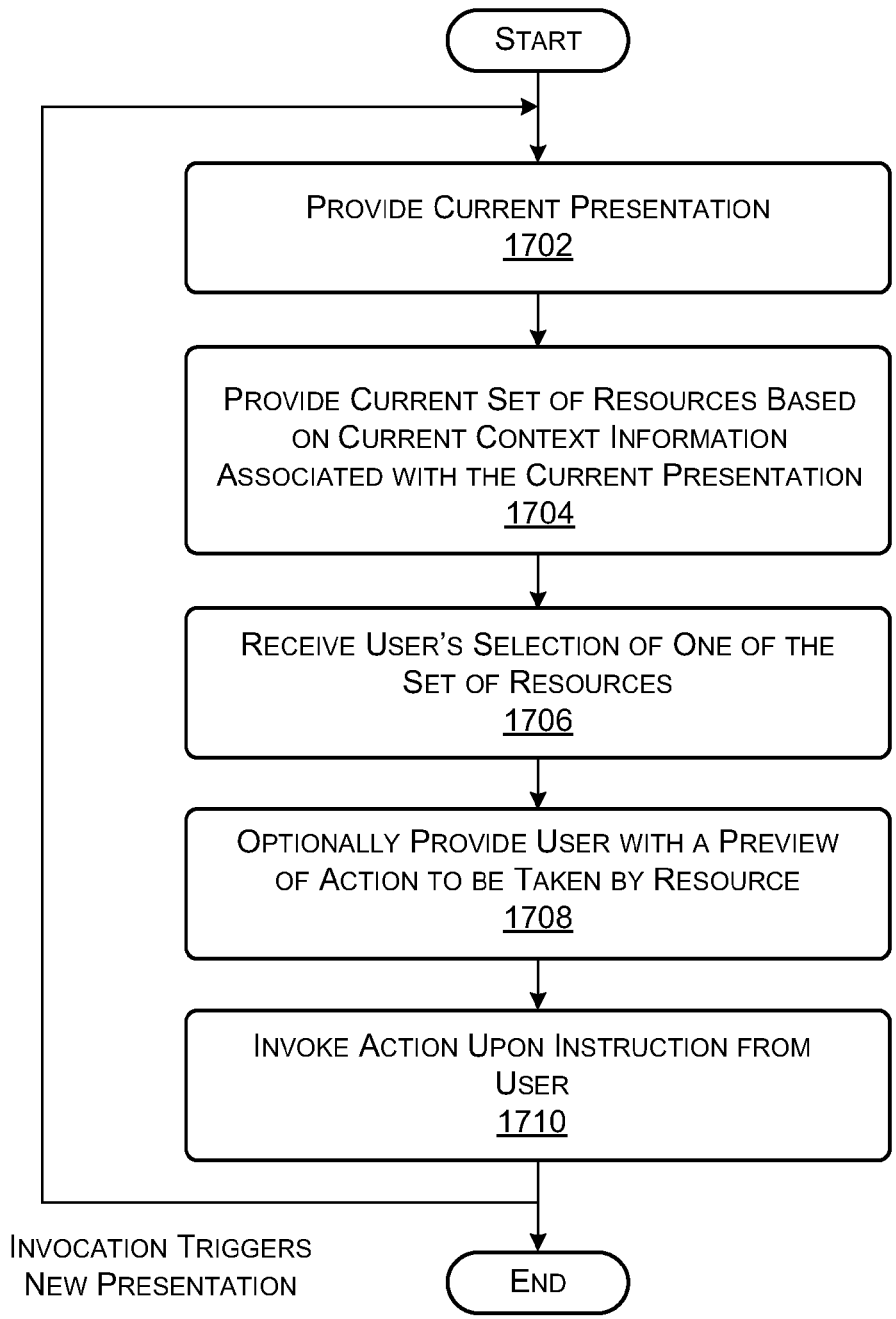
FIG. 17 is a flowchart which describes one manner of operation of a presentation module of the environment of FIG. 1.

FIG. 17 shows a procedure 1700 which describes one manner of operation of the presentation module 102 of the environment of FIG. 1. In block 1702, the presentation module 102 provides current content 104, such as the Email message 304 shown in FIG. 3. In block 1704, the presentation module 102 provides a set of resources to the user, selected based on their assessed relevancy to the content 104 provided in block 1702. In block 1706, the presentation module 102 receives the user's selection of one of the resources.

In block 1708, the presentation module 102 can optionally provide the user with preview information which indicates the nature of an action that will be invoked by the selected resource. For example, as shown in FIG. 5, the presentation module 102 provides a pop-up display which shows a search that will be conducted by a restaurant recommendation service. In performing this task, the resource selection module 110 can extract salient information from the content shown provided in block 1702. For example, in the example of FIG. 5, the resource selection module 110 can extract keywords from the Email message 304 for use as search terms. The resource selection module 110 can use any information extraction technique to identify salient information within content. Finally, in block 1710, the presentation module 102 can invoke the action identified in block 1708. Optionally, the presentation module 102 can invoke an action without presenting preview information.

FIG. 17 depicts a loop which directs the flow back to block 1702. This indicates that a selection of a resource by the user will prompt the generation of new content and a new relevant set of resources. FIGS. 3-9 provide an example of this behavior.

Figure 18:
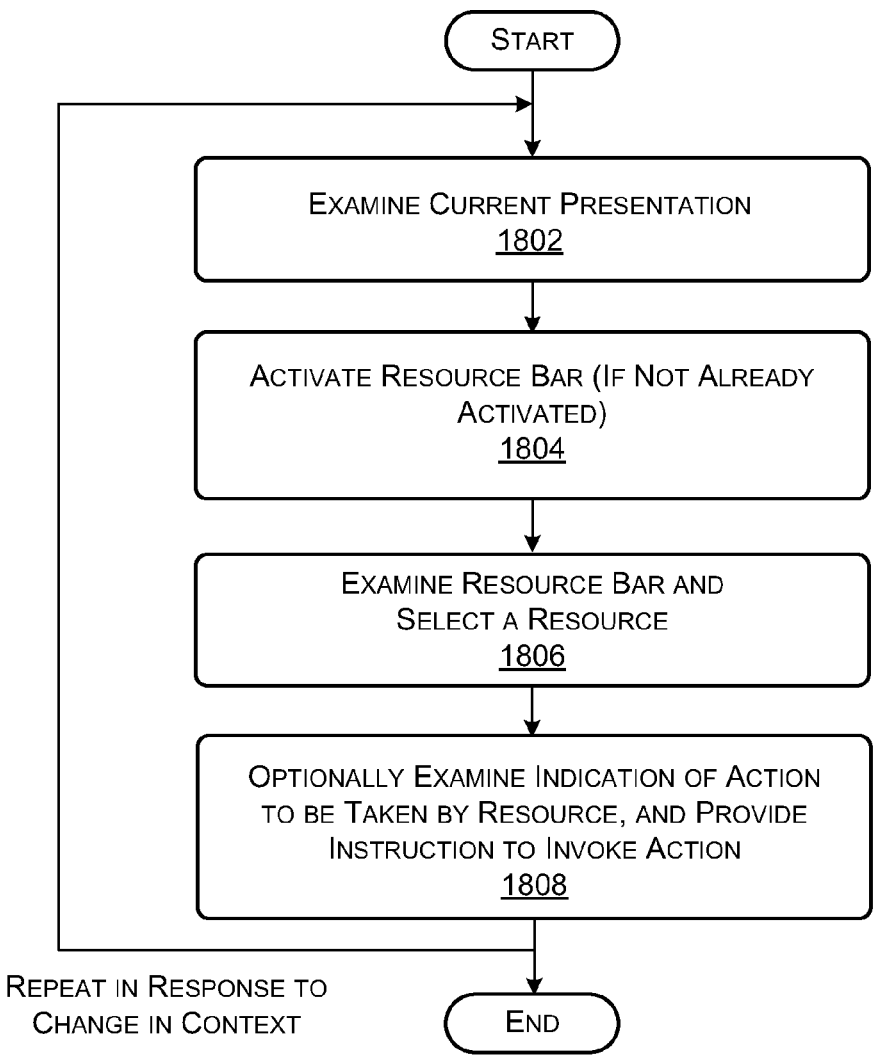
FIG. 18 is a flowchart that describes one manner of use of the environment of FIG. 1, from the perspective of a user.

FIG. 18 shows a procedure 1800 that describes one manner of use of the environment of FIG. 1, from the perspective of a user. In block 1804, the user examines current content 104 that is presented by the presentation module 102, such as the Email message 304 of FIG. 2. In block 1804, the user activates the application bar 318 if the application bar 318 is initially in a collapsed state. In block 1806, the user examines the set of resource revealed by the application bar 318 and selects one of the resources. In block 1808, the user can optionally examine preview information which indicates an action that will be invoked by the selected resource. The depicted loop indicates that the actions of the user prompt the environment 100 to provide new content information to the user, upon which the user repeats the above-indicated actions.

C. Representative Processing Functionality

FIG. 19 sets forth illustrative electrical data processing functionality 1900 that can be used to implement any aspect of the functions described above. With reference to FIG. 1, for instance, the type of processing functionality 1900 shown in FIG. 19 can be used to implement any aspect of the presentation module 102, any aspect of the information extraction module 108, any aspect of the resource selection module 110, any aspect of any of the entities 112, etc. In one case, the processing functionality 1900 may correspond to any type of computing device (or plural such devices of any type), each of which includes one or more processing devices.

The processing functionality 1900 can include volatile and non-volatile memory, such as RAM 1902 and ROM 1904, as well as one or more processing devices 1906. The processing functionality 1900 also optionally includes various media devices 1908, such as a hard disk module, an optical disk module, and so forth. The processing functionality 1900 can perform various operations identified above when the processing device(s) 1906 executes instructions that are maintained by memory (e.g., RAM 1902, ROM 1904, or elsewhere). More generally, instructions and other information can be stored on any computer readable medium 1910, including, but not limited to, static memory storage devices, magnetic storage devices, optical storage devices, and so on. The term computer readable medium also encompasses plural storage devices.

The processing functionality 1900 also includes an input/output module 1912 for receiving various inputs from a user (via input modules 1914), and for providing various outputs to the user (via output modules). One particular output mechanism may include a display device 1916 and an associated graphical user interface (GUI) 1918. The processing functionality 1900 can also include one or more network interfaces 1920 for exchanging data with other devices via one or more communication conduits 1922. One or more communication buses 1924 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using at least one computing device, for identifying a set of resources associated with respective domains, comprising:
providing context information that pertains to interaction, by a user, with a user device, the context information including textual information associated with content presented to the user by the user device;
providing, for each of a plurality of individual domains, individual-domain score information that indicates relevance of the context information to a corresponding individual domain, plural instances of the individual-domain score information comprising plural-domain score information, the providing including
(i) receiving data from an entity associated with corresponding individual domain, the data characterizing at least goods or services of the entity, and
(ii) generating a language model that identifies characteristics of the entity, based on the received data; and
identifying a set of resources based on the plural-domain score information for presentation to the user, the set of resources assisting the user in performing an action within a task having plural parts.

2. The method of claim 1, wherein the textual information comprises a document that is presented to the user.

3. The method of claim 1, wherein said context information also includes supplemental information that is obtained from a source other than the content that is presented to the user.

4. The method of claim 1, wherein the individual-domain score information for the corresponding individual domain pertains to a probability of occurrence of the context information within the corresponding individual domain, divided by a probability of occurrence of the context information outside of the corresponding individual domain.

5. The method of claim 1, wherein said providing of individual-domain score information comprises:
generating the individual-domain score information by evaluating the context information with respect to the language model.

6. The method of claim 5, wherein said generating of the language model comprises using an n-gram technique to generate the language model.

7. The method of claim 6, wherein, in the n-gram technique, the language model approximates a probability of an occurrence (P) of a string (s) occurring within the textual information, based on the following:

$$P(s) = \sum_{i=1}^{m} p(w_i \mid w_{i-1})$$
$$= P(w_1) \cdot P(w_2 \mid w_1) \cdot P(w_3 \mid w_2) \cdot P(w_4 \mid w_3) \cdot$$
$$P(w_5 \mid w_4) \ldots \cdot P(w_m \mid w_{m-1})$$

wherein m is a number of words in the string (s) and w is word.

8. The method of claim 5, wherein said generating of the language model comprises generating plural language models for the corresponding individual domain.

9. The method of claim 1, wherein said identifying of the set of resources comprises ranking resources based on the plural-domain score information.

10. The method of claim 9, wherein said ranking is also based on at least one factor other than the plural-domain score information, said at least one factor operating to modify the plural-domain score information.

11. The method of claim 1, further comprising repeating said identifying of the set of resources as the user progresses through the task, wherein, at each part of the task, the method presents the user with a current set of resources associated with current context information, the current set of resources assisting the user in completing a next part of the task.

12. The method of claim 1, wherein the set of resources comprises application modules that are executable by the user device.

13. A computer readable medium for storing computer readable instructions, the computer readable instructions providing a presentation module when executed by one or more processing devices, the computer readable instructions comprising:
logic configured to provide a current presentation to a user via a user device;
logic configured to provide a set of resources selected based on current context information associated with the current presentation, the set of resources associated with plural respective domains;
logic configured to receive a selection by a user of a resource from among the set of resources, to identify a selected resource;
logic configured to invoke an action provided by the selected resource, causing presentation of a new current presentation associated with new current context information; and
logic configured to provide a preview of the action provided by the selected resource, the action involving use of a text portion of the current context information,
wherein the logic configured to provide a set of resources is configured to:
make model-generating functionality and score-generating functionality available to an entity associated with the corresponding individual domain, together with the context information; and
receive a individual-domain score information from the entity, based on generation, by the entity, of the individual-domain score information using the model-generating functionally and the score-generating functionality.

14. The computer readable medium of claim 13, wherein said logic configured to provide a set of resources is operative to display the set of resources as a set of selectable icons.

15. The computer readable medium of claim 13, wherein said logic configured to provide a set of resources is operative to provide at least one resource that is independent of the context information.

16. A computer readable medium for storing computer readable instructions, the computer readable instructions providing a presentation module when executed by one or more processing devices, the computer readable instructions comprising:
logic configured to provide, for each of a plurality of domains, individual-domain score information that indicates relevance of context information to a corresponding individual domain, plural instances of the individual-domain score information comprising plural-domain score information, each instance of the individual-domain score information being generated based on a language model for the corresponding individual domain, the context information being extracted from displayable content before the displayable content is displayed to a user; and logic configured to select a set of application modules based on the plural-domain score information for presentation to the user, the set of application modules facilitating completion, by the user, of an action within a task, and wherein the logic configured to provide individual-domain score information is configured to:

make model-generating functionality available to an entity associated with the corresponding individual domain; and receive a language model from the entity that is associate with the corresponding individual domain.

17. The resource selection system of claim 16, wherein at least a subset of the set of application modules correspond to application modules that are currently installed or referenced by the user device.

* * * * *